(12) United States Patent
Draper et al.

(10) Patent No.: US 12,502,917 B2
(45) Date of Patent: Dec. 23, 2025

(54) WEIGHT DISTRIBUTION SYSTEM

(71) Applicant: HORIZON GLOBAL AMERICAS INC., Plymouth, MI (US)

(72) Inventors: Owen Draper, Plymouth, MI (US); Bradley Larsh, Plymouth, MI (US)

(73) Assignee: Horizon Global Americas Inc., Plymouth, MI (US)

( * ) Notice: Subject to any disclaimer, the term of this patent is extended or adjusted under 35 U.S.C. 154(b) by 771 days.

(21) Appl. No.: 17/722,781

(22) Filed: Apr. 18, 2022

(65) Prior Publication Data
US 2022/0332155 A1    Oct. 20, 2022

Related U.S. Application Data

(60) Provisional application No. 63/175,605, filed on Apr. 16, 2021.

(51) Int. Cl.
B60D 1/24 (2006.01)

(52) U.S. Cl.
CPC .................................. B60D 1/247 (2013.01)

(58) Field of Classification Search
CPC ............................... B60D 1/247; B60D 1/167
USPC .......................................................... 280/455.1
See application file for complete search history.

(56) References Cited

U.S. PATENT DOCUMENTS

| | | | | |
|---|---|---|---|---|
| 3,600,004 | A * | 8/1971 | Newkirk | B60D 1/345 280/455.1 |
| 3,731,950 | A * | 5/1973 | Burcham | B60D 1/345 280/406.2 |
| 2017/0050482 | A1 * | 2/2017 | Olson | B60D 1/60 |
| 2020/0324591 | A1 * | 10/2020 | McCall | B60D 1/247 |
| 2023/0063074 | A1 * | 3/2023 | Hall | B60D 1/06 |

* cited by examiner

*Primary Examiner* — Valentin Neacsu
*Assistant Examiner* — Felicia L. Brittman-Alabi
(74) *Attorney, Agent, or Firm* — DAY PITNEY LLP; George N. Chaclas; Christopher J. Head

(57) ABSTRACT

The present invention relates generally to a weight distribution system, and; more specifically, the present invention relates to a system of distributing weight of a towed vehicle to a towing vehicle and controlling sway of the towed vehicle relative to the towing vehicle. In one embodiment, the present invention relates to various different embodiments of a variable load rating spring arm (or spring bar) for a weight distribution systems.

13 Claims, 19 Drawing Sheets

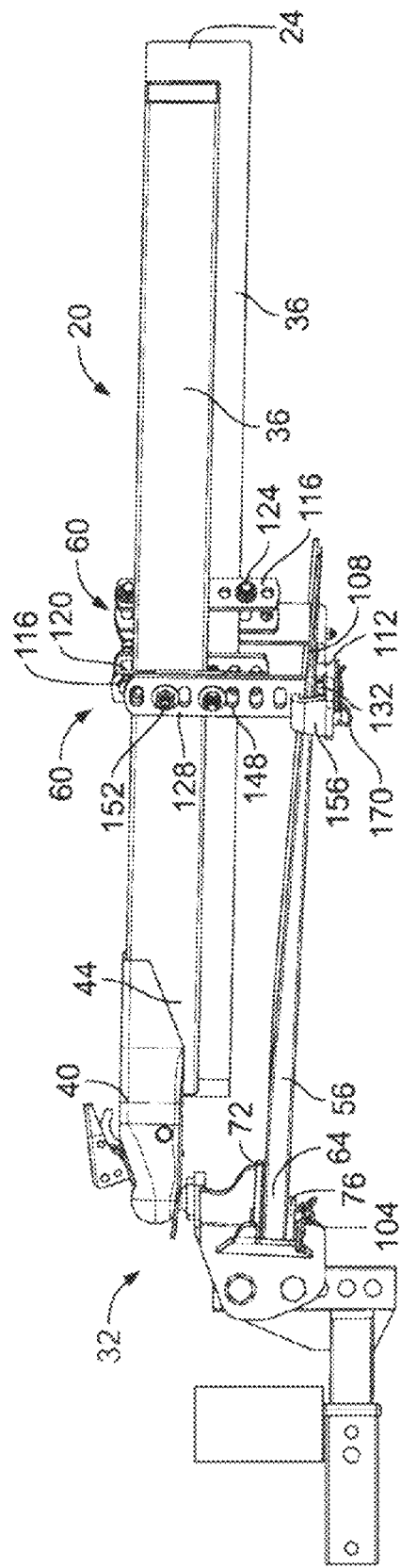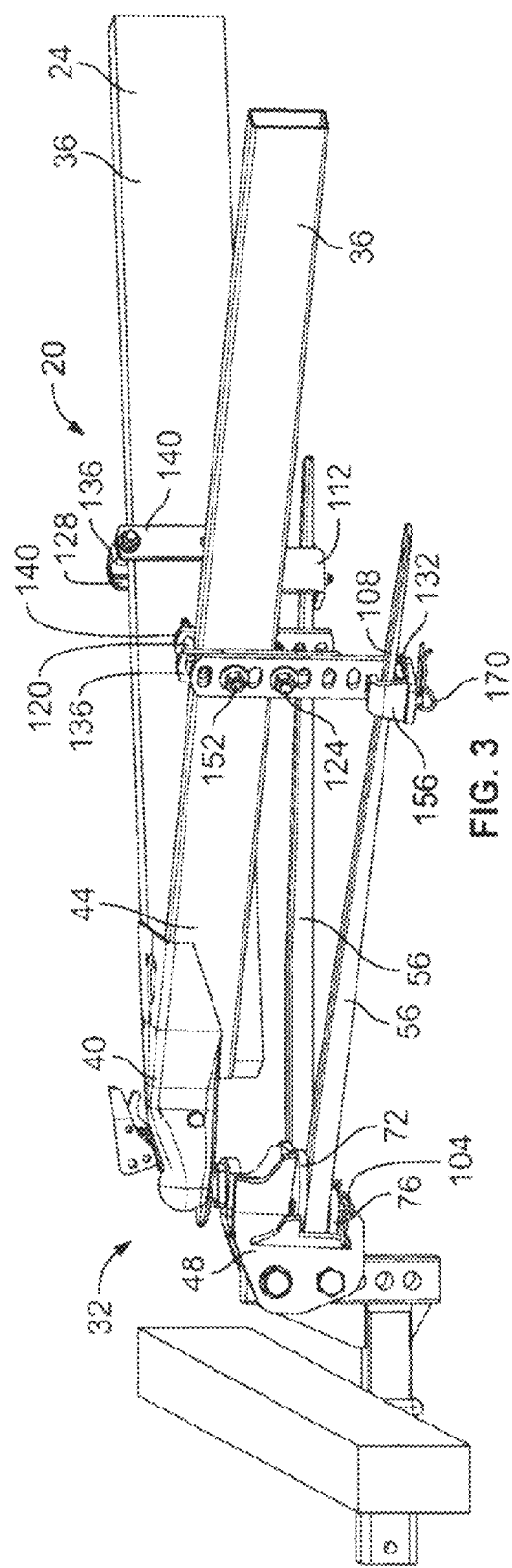
FIG. 2
FIG. 3

WITHOUT WEIGHT DISTRIBUTION     WITH WEIGHT DISTRIBUTION

SHANK     SPRING BARS
    BALL MOUNT

TRAILER PITCH VARIES HOW MUCH THE SPRING BAR
TORQUES THE TRUCK DOWN.

WEIGHT DISTRIBUTION SYSTEM

CROSS REFERENCE TO RELATED APPLICATIONS

This application claims priority to Provisional Application No. 63/175,605 filed on Apr. 16, 2021 and entitled "WEIGHT DISTRIBUTION SYSTEM," which is incorporated herein by reference in its entirety.

FIELD OF THE INVENTION

The present invention relates generally to a weight distribution system and, more specifically, to a system of distributing weight of a towed vehicle to a towing vehicle and controlling sway of the towed vehicle relative to the towing vehicle. In one embodiment, the present invention relates to various different embodiments of a variable load rating spring arm (or spring bar) for a weight distribution systems.

BACKGROUND

Many vehicles are designed to transport freight, goods, merchandise, personal property, and other such cargo. Often, such vehicles are arranged to tow a towed vehicle, such as a trailer by attaching the towed vehicle to the towing vehicle though the use of a hitch assembly. For example, a hitch assembly may attach a trailer to a towing vehicle through a hitch ball and coupler arrangement that allows relative movement between the towing vehicle and the trailer as the towing vehicle makes turns, traverses uneven or rough terrain, and passes along inclining and declining roadways.

Even distribution of the weight of a towed vehicle among the axles of the towing vehicle is important to the effective operation of a towing vehicle that is towing the towed vehicle. Towed vehicles are often loaded with heavy cargo and may substantially outweigh the towing vehicle. When such a towed vehicle is coupled or secured to the rear of a towing vehicle, the majority of the weight of the towed vehicle may be born by the rear axle of a towing vehicle. Such uneven weight distribution may lower the rear of the towing vehicle and raise the front of the towing vehicle. Under such conditions, the tires of the rear axle may bear substantially more weight than the tires of the front axle of the towing vehicle.

Controlling the sway movement of the towed vehicle (i.e., lateral or side-to-side movement of the trailer with respect to the towing vehicle) relative to the towing vehicle as the trailer is towed is also important to the effective operation of a towing vehicle. While relative motion of the trailer with respect to the towing vehicle is necessary to accommodate turns and inclining and declining roadways, excess sway of the towed vehicle may be undesirable. This may be particularly true when the load that is being towed is heavy relative to the weight of the towing vehicle.

Many factors may contribute to the swaying of a towed vehicle. For example, crosswinds impacting the trailer; unevenly loaded towed vehicles; inclined, declined, and sloped roadways; winding roadways; and rough and uneven terrain may all contribute to swaying of the towed vehicle. Such factors may be exacerbated as the speed of the vehicle increases. As previously mentioned, towed vehicles and cargo may substantially outweigh a towing vehicle. When such a towed vehicle begins to sway, particularly when driven at high speeds such as on a highway, the towed vehicle may transfer sufficient side-to-side and lateral forces to the towing vehicle to cause undesirable driving conditions.

Weight distributing systems, with sway dampening, have been used to remedy these conditions. However, attaching such weight distribution systems can often be time consuming and difficult. Further still, these weight distributing system use spring bars of a single defined shape. This may mean that if the weight distribution system is used with different towed vehicle or towing vehicles, different spring bars may be required to be utilized. Additionally, the use of composites in weight distributing systems may face challenges at interfaces with metal components, including wear, bearing loads, and fastening or retention issues. As a result, these weight distributing systems may experience limitations in form and materials.

Thus, given the shortcomings in the art, there is a need for a weight distributing system with sway dampening that is able to accommodate different uses of the weight distributing system. There is also need for a weight distributing system that is easier and quicker to assemble and for a weight distributing system that utilizes a variable load rating spring bar so as to permit a weight distributing system to be easily altered or customized depending on the object being towed or the vehicle that is towing. There is also a need for a weight distributing system that is able to incorporate composites and metal components.

SUMMARY

The present invention relates generally to a weight distribution system, and; more specifically, the present invention relates to a system of distributing weight of a towed vehicle to a towing vehicle and controlling sway of the towed vehicle relative to the towing vehicle. In one embodiment, the present invention relates to various different embodiments of a variable load rating spring arm (or spring bar) for a weight distribution systems.

A weight distribution system is shown and described. The weight distribution system may include a spring arm (or spring bar) configured to be operatively engaged between plate members of a ball mount, and a pin member inserted into the spring arm (or spring bar), the pin member configured to secure the spring arm (or spring bar) with the ball mount. The weight distribution system may also include an attachment mechanism configured to selectively place the spring arm (or spring bar) in mechanical communication with a towed vehicle.

A weight distribution system may include a ball mount adapted to be mounted to a hitch of a towing vehicle, a spring arm (or spring bar) operatively inserted into the ball mount, and a pin inserted into the spring arm (or spring bar) and the ball mount, the pin member operatively securing the spring arm (or spring bar) directly with the ball mount. The weight distribution system may also include an attachment mechanism configured to selectively place the spring arm (or spring bar) in mechanical communication with a towed vehicle.

A weight distribution system may include a ball mount adapted to be mounted to a hitch of a towing vehicle, the ball mount including first and second plate members, a spring arm (or spring bar) operatively engaged between the first and second plate members, and a pin inserted into the spring arm (or spring bar) and the first and second plate members, the pin member operatively securing the spring arm (or spring bar) with the ball mount. The weight distribution system may also include an attachment mechanism selectively placing the spring arm (or spring bar) in mechanical communication with a towed vehicle.

A weight distributing system may include a spring arm (or spring bar) that is designed to permit multiple load ratings in the same spring bar depending upon the orientation of such a spring arm (or spring bar) as it is placed into the various weight distributing systems disclosed herein.

DESCRIPTION OF THE DRAWINGS

Operation of the present teachings may be better understood by reference to the detailed description taken in connection with the following illustrations. These appended drawings form part of this specification, and written information in the drawings should be treated as part of this disclosure. In the drawings:

FIG. 2 is a side view of the weight distribution and sway control system;

FIG. 3 is a side perspective view of the weight distribution and sway control system;

DESCRIPTION OF THE INVENTION

The present invention relates generally to a weight distribution system, and; more specifically, the present invention relates to a system of distributing weight of a towed vehicle to a towing vehicle and controlling sway of the towed vehicle relative to the towing vehicle. In one embodiment, the present invention relates to various different embodiments of a variable load rating spring arm (or spring bar) for a weight distribution systems.

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

Figure 1:
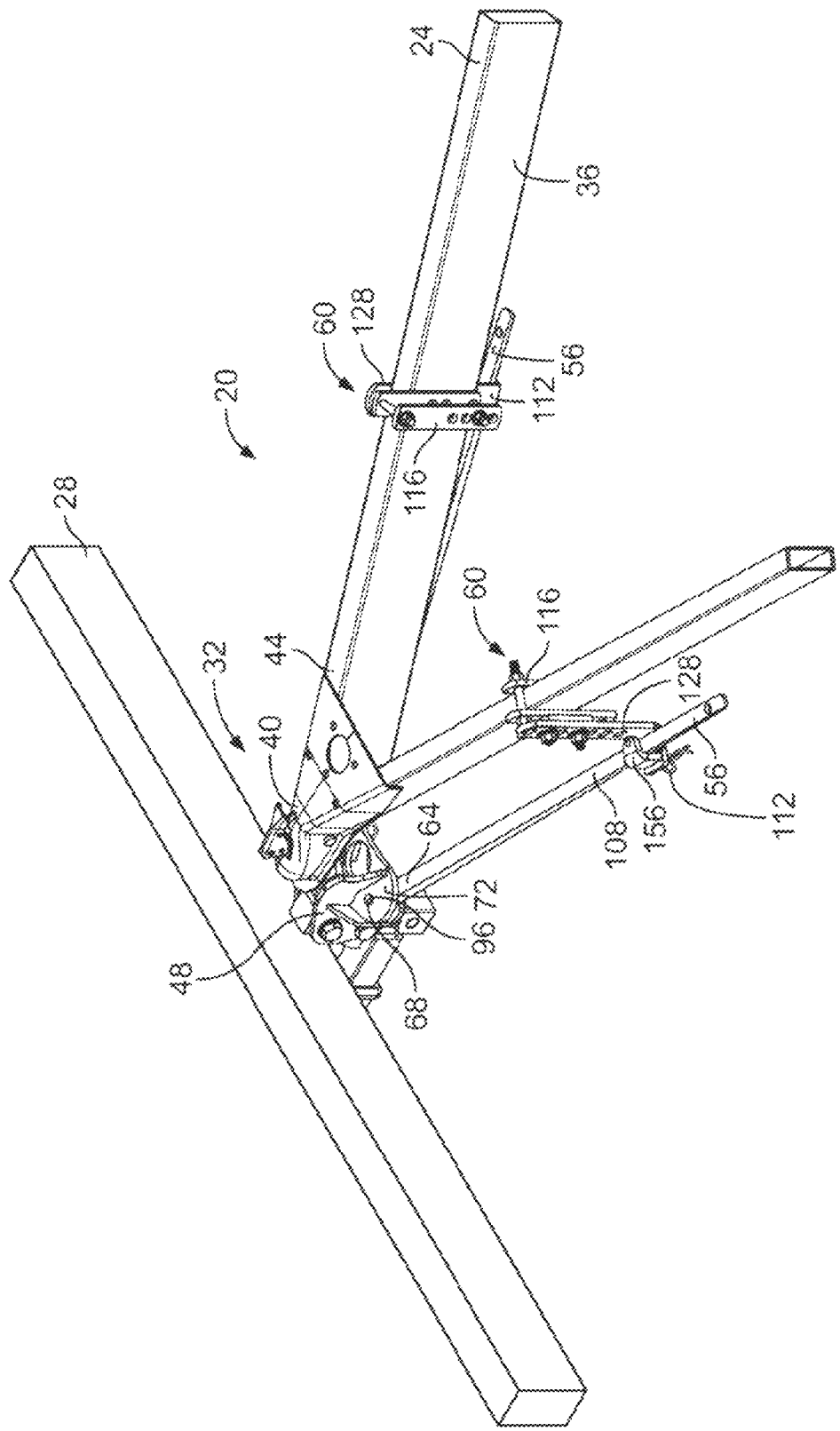
FIG. 1 is a top perspective view of embodiments of a weight distribution and sway control system.
Figure 4:
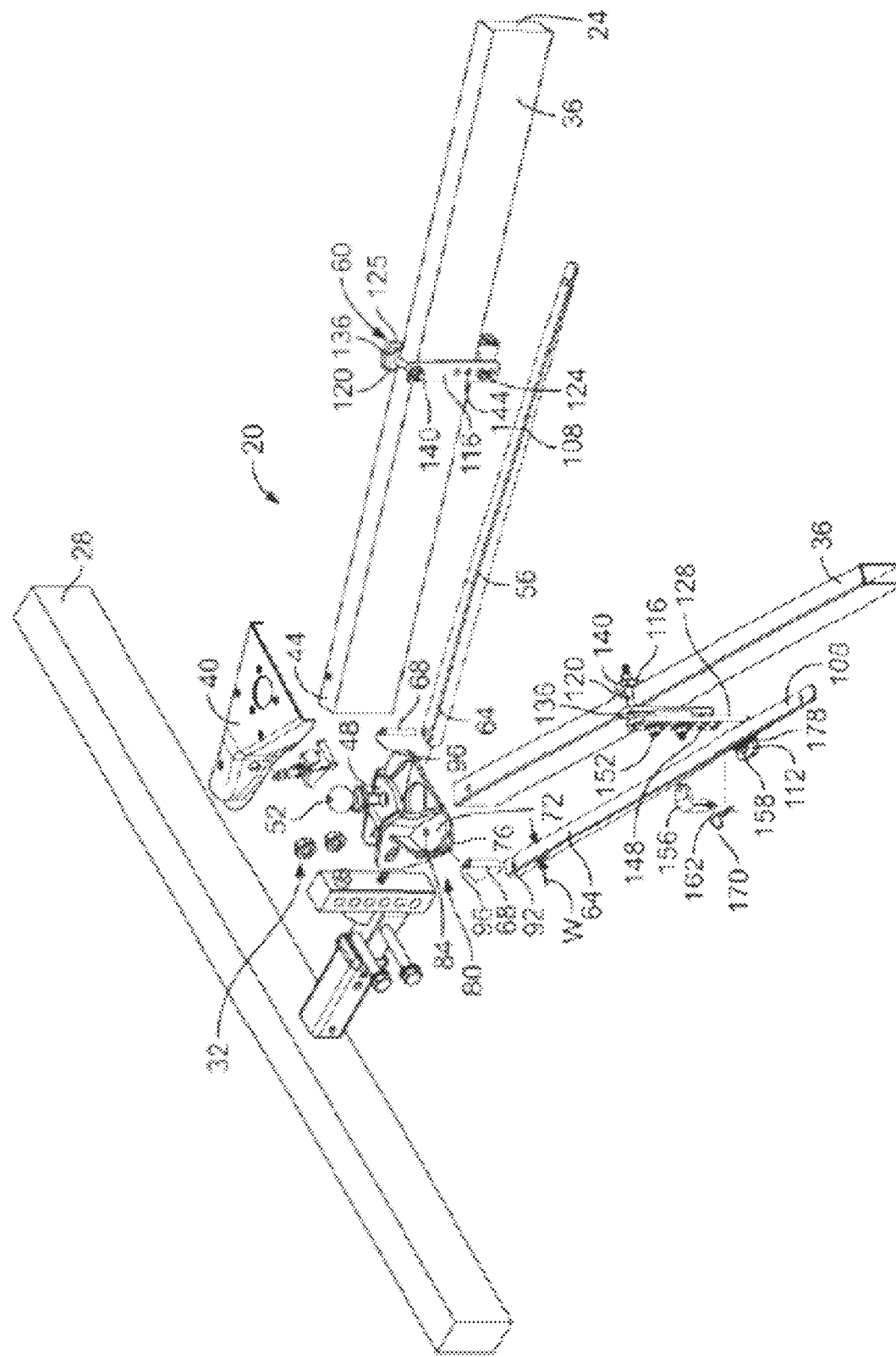
FIG. 4 is an exploded view of a portion of the weight distribution and sway control system.

FIGS. 1 through 4 illustrate an exemplary embodiment of a hitch assembly 20 for distributing weight and controlling sway of a towed vehicle 24 attached to a towing vehicle 28, a portion of which is shown in FIG. 1. The towed vehicle 24 may be coupled, attached, or otherwise secured to the towing vehicle 28 through any appropriate manner. By way of a non-limiting example, a hitch ball and coupler arrangement 32 may be utilized. It should be understood, however, that will a ball and coupler are shown, the present teachings are not limited to this configuration. Any appropriate engagement between a towing vehicle and towed vehicle may be utilized.

As shown in FIGS. 1 and 2, the towed vehicle 24 may include an A-frame member 36, with a coupler 40 attached to a front end 44 of the A-frame member 36. A ball mount 48 may be attached to the towing vehicle 28 in any appropriate manner. The ball mount 48 may include a hitch ball 52 secured thereto. In such embodiments, the coupler 40 may be positioned over the hitch ball 52 and secured with the hitch ball 52, thus securing the towed vehicle 24 to the towing vehicle 28. It should be understood, however, that the towed vehicle 24 may be secured with the towing vehicle 28 in any appropriate manner and is not limited to that shown and described herein.

The exemplary hitch assembly 20 as illustrated and described may provide additional linkages between the A-frame member 36 of the towed vehicle 24 and the ball mount 48. This arrangement may allow for distribution of weight of the towed vehicle 24 and may control sway of the towed vehicle 24.

The hitch assembly 20 may also include a pair of spring arms (or spring bars) 56. The pair of spring arms (or spring bars) 56 may be substantially similar to one another; however the present teachings are not limited to such. Only one reference number will be used for the pair of spring arms (or spring bars) 56, and any illustration or description of a spring arm (or spring bar) 56 will apply to either spring arm (or spring bar) 56 unless context or this disclosure suggests otherwise. It is noted that various embodiments of spring arms (or spring bars) are disclosed herein, including pairs of spring arms (or spring bars) that are substantially similar in a pair and that are different in a pair, such as in FIGS. 5-14, for example.

The hitch assembly 20 may further include a pair of attachment assemblies 60. The pair of attachment assemblies or mechanisms 60 may be substantially similar; however, the present teachings are not limited to such. In some embodiments, the pair of attachment assemblies 60 may be of a different configuration. For purposes of this disclosure, only one reference number will be used for the pair of attachment assemblies 60, and any illustration or description of an attachment assembly 60 will apply to either attachment assembly 60 unless context or this disclosure suggests otherwise. Although an exemplary embodiment is illustrated and described herein as having a pair of spring arms (or spring bars) 56 and a pair of attachment assemblies 60, it will be readily understood by those skilled in the art that a hitch assembly 20 may include greater of fewer than two spring arms (or spring bars) 56 and greater than or fewer than two attachment assemblies 60 to attach those spring arms (or spring bars) 56 to a towed vehicle 24. It is noted that various embodiments of attachment assemblies or mounts that selectively attach the spring arms (or spring bars) to the towed vehicle 24, such as to the A-frame member 36, are disclosed herein, such as in FIGS. 19-21, for example.

A first end 64 of the spring arm (or spring bar) 56 may be operatively coupled directly to the ball mount 48, such as through the use of a fastener 68. In such embodiments, the ball mount 48 may include a first and second plate members 72, 76 axially spaced from each other such that a space 80 is formed therebetween. The spring arm (or spring bar) 56 may be configured to generally fit between the first and second plate members 72, 76, i.e., the spring arm (or spring bar) 56 may be configured to operatively fit within the space 80. The height H of the spring arm (or spring bar) 56 may permit it to fit within the space 80. This may result in high loads within the ball mount 48. In some embodiments, the fit between the spring arm (or spring bar) 56 and the first and second plate members 72, 76 may be tight, which may create large frictional load in the ball mount 48. This large frictional load may provide more sway dampening to the hitch assembly 20.

Each of the first and second plate members 72, 76 may include an aperture 84. In such embodiments, the spring arm (or spring bar) 56 may also include an aperture 92. The aperture 92 may extend through a height H of the spring arm (or spring bar) 56. The spring arm (or spring bar) 56 may be positioned between the first and second plate members 72, 76, and the apertures 84 may be generally aligned with the aperture 92 of the spring arm (or spring bar) 56. Once aligned, the 68 fastener of any appropriate configuration, such as a pin shown in the drawings may be inserted through the apertures 84, 92. This may result in the spring arm (or spring bar) 56 being operatively coupled with the ball mount 48 with the pin 68 being vertically positioned through the mount head 48 and spring arm (or spring bar) 56. In some embodiments, this may result in the spring arm (or spring bar) 56 being pivotally and operatively coupled with the ball mount 48.

The fastener 68 may include a head 96 that may engage the first plate member 72. The head 96 may be sized to generally prevent the entire fastener 68 from passing into or through the aperture 84. Distally spaced from the head 96 of the fasteners, an aperture 100 may be positioned within the fastener 68. The aperture 100 may be of any appropriate configuration. In some embodiments, a second fastener 104, such as the clip shown, may be inserted into the aperture 100 and engaged with the fastener 68. The clip 104 may generally prevent the fastener 68 from entering into or through the aperture of the second plate member 76. This may generally keep the spring arm (or spring bar) 56 operatively coupled with the ball mount 48.

In some embodiments, the vertical positioning of the fastener or pin 68 to attach the spring arm (or spring bar) 56 with the ball mount 48 may provide a spring arm pivot point. This pivot point may use fewer components to secure the spring arm (or spring bar) 56 with the ball mount 48. Most other systems use an intermediate piece, such as a trunnion with a horizontal pin or a bushing with a horizontal connecting pin, to connect the spring arm assembly to the ball mount. The present hitch assembly 20 does not use the intermediate piece and the pin 68 is vertically attached.

It is noted that various embodiments of ball mount heads 48 and attachment portions thereto that selectively couple the spring arms (or spring bars) to the towing vehicle 28 are disclosed herein, such as in FIGS. 15-18, for example.

The attachment assembly 60 may selectively attach, couple, or otherwise secure a second or opposite end 108 of the spring arm (or spring bar) 56 to the A-frame 36 of the towed vehicle 24. As best seen in FIG. 1, the attachment assembly 60 may include a shoe bracket 112, a frame bracket 116 with top and bottom pins 120, 124, a side bracket 128, and a friction pad 132. As will be described in detail below, the attachment assembly 60 may selectively attach or couple the spring arm (or spring bar) 56 to the towed vehicle 24. This may result in the spring arm (or spring bar) 56 assisting with distributing the weight of the towed vehicle 24 to and with the towing vehicle 28 and generally controlling the sway of the towed vehicle 24 relative to the towing vehicle 28. In addition, the spring arm (or spring bar) 56 may be attached or coupled to the towed vehicle 24 such that this attachment may allow the towed vehicle 24 to move laterally with respect to the towing vehicle 28 so as to accommodate operations such as turning the towing vehicle 28 to the left and right. By way of a non-limiting example, the fastener 68 may permit the spring arm (or spring bar) 56 to be pivotally attached with the ball mount 48. This arrangement, however, may also provide sufficient sway force resistance to generally dampen or generally eliminate sway as the towing vehicle 28 tows the towed vehicle 24.

It should be appreciated that selectively attaching or coupling the spring arm (or spring bar) 56 to the towed vehicle 28 with the attachment assembly 60 may be accomplished through the transfer of force between the components. By way of a non-limiting example, the spring arm (or spring bar) 56 may be coupled to the towed vehicle 24 by the spring arm (or spring bar) 56 applying a force to the towed vehicle 24 through the attachment mechanism 60. Such a force may be arranged to keep the spring arm (or spring bar) 56 in general contact with, and thus attached to, the attachment mechanism 60 throughout the operation of the towing vehicle 28. In other words, the spring arm (or spring bar) 56 may be in mechanical contact with the towed vehicle 24 through the attachment mechanism 60 throughout the operation of the towing vehicle 28. In other embodiments, a force may be arranged to keep the spring arm (or spring bar) 56 generally in contact with the attachment mechanism 60 throughout certain operations of the towing vehicle 28 and may allow the spring arm (or spring bar) 56 to break contact with the attachment mechanism 60 throughout other operations of the towing vehicle 28. In other words, the spring arm (or spring bar) 56 may selectively be in mechanical contact with the towed vehicle 24 through the attachment mechanism 60 throughout the operation of the towing vehicle 28.

In such embodiments, the attachment mechanism 60 may include the frame bracket 116, which may include two vertically extending bracket members 136, 140. Although the frame bracket 116 is shown as a coupling of two components, it will be readily understood by those skilled in the art that the frame bracket 116 may be monolithically formed. The two vertically extending brackets members 136, 140 may, in some embodiments, be of substantially the same configuration. However, the present teachings are not limited to such; the two vertically extending bracket members 136, 140 may also be of different construction from one another.

The two vertically extending bracket members 136, 140 may include at least one aperture 144 that may be sized to accept the top and bottom pins 120, 124. The top and bottom pins 120, 124 may be of any appropriate construction. By way of a non-limiting example, the top and bottom pins 120, 124 may be a fastener, such as a bolt, rivet, or the like. In some embodiments, the two vertically extending bracket members 136, 140 may include a series of apertures 144 or a plurality of apertures 144 that may also be sized to accept a fastener, such as a bolt, rivet, or the like, including, without limitation the top and bottom pins 120, 124.

The side bracket 128 may include a series of apertures 148 sized to accommodate a fastener, such as a bolt, rivet, or the like, and may be arranged such that at least one aperture 148 of the side bracket 128 mates or generally aligns with at least one of the apertures 144 of the frame bracket 116. Fasteners may be passed through mated apertures 144, 148 to couple the frame bracket 116 and side bracket 128 together. By way of a non-limiting example, the bottom pin 124 may be inserted through the mated apertures 144, 148. In some embodiments, a fastener 152 may be inserted into and through mated apertures 144, 148 of the frame bracket 116 and the side bracket 128 and may extend into the A-frame 36.

The shoe bracket 112 may be attached with the side bracket 128 in any appropriate manner. By way of non-limiting examples, the side bracket 128 may be monolithically formed with the shoe bracket 112, or the shoe bracket 112 may be attached with the side bracket 128 such as through welding, fastening or otherwise adhering.

In some embodiments, the shoe bracket 112 may include a generally L-shaped member 156. The L-shaped member 156 may be monolithically formed with the shoe bracket 112 or may be attached thereto such as through welding, fastening, adhering or the like. By way of a non-limiting example, the shoe bracket 112 may include an aperture 158 and the L-shaped member 156 may include a tab 162 sized and shaped to be inserted into and through the aperture 158. The tab 162 may include an aperture 166 through which a clip 170 may be inserted to secure L-shaped member 156 with the shoe bracket 112. The L-shaped member 156 being attached with the shoe bracket 112 may generally form a cavity 174 into which or through which the spring arm (or spring bar) 56, or more specifically, the second end 108 may engage. In such embodiments, the L-shaped member 156 may be selectively attached with the shoe bracket 112. This may simplify the engagement of the spring arm (or spring bar) 56 with the shoe bracket 112. In such embodiments, the clip 170 may be removed from the aperture 158 of the L-shaped member 156. The L-shaped member 156 may then be removed from the aperture 158 of the shoe bracket 112. This may provide easy access for the spring arm (or spring bar) 56 to be engaged with the shoe bracket 112. Once the spring arm (or spring bar) 56, i.e., the second end 108 is engaged with the shoe bracket 112, the L-shaped member 156 may then be attached to the shoe bracket 112. This may form the cavity 174 in which the spring arm (or spring bar) 56 may be positioned.

The friction pad 132 may be positioned or coupled to a flat inner surface 178 of the shoe bracket 112. The friction pad 132 as illustrated may be comprised of any appropriate material that may generally resist movement of components in contact with the friction pad 132 including, without limitation automotive composites and other high friction materials.

In some embodiments, the attachment assembly 60 may be attached to the A-frame member 36 of the towed vehicle 24 as follows: The frame bracket 116, or more specifically, the vertically extending bracket members 136, 140 may be placed on either side of the A-frame member 36. The top pin member 120 may be inserted into the corresponding apertures 144. The side bracket 128 may then be aligned appropriately with respect to the frame bracket 116. The series of apertures 144, 148, respectively, may allow for the assembly 60 to be attached to A-frame members 36 of varying heights. The fastener 152 may be inserted into one of the series of apertures 148 of the side bracket 128 and one of the vertically extending bracket members 136 (or 140) and into the A-frame 36. The side bracket 116 may be positioned relative to the A-frame 36 and the frame bracket 116 such that the shoe bracket 112 is appropriately positioned relative to the spring arm (or spring bar) 56.

Such an arrangement may allow for variation of the height of the shoe bracket 112 by enabling an operator or installer to selectively choose to align the apertures 148 of the side bracket 128 with higher or lower aligned apertures 144 in the frame bracket 116 or more specifically the vertically extending bracket members 136, 140.

Once the attachment assembly 60 is secured to the A-frame member 36, each spring arm (or spring bar) 56 may be positioned within a shoe bracket 112. To provide weight distribution and sway control, the spring arm (or spring bar) 56 may be preloaded by bending the arm 56 upward, through the use of a jack or other such method, before the spring arm (or spring bar) 56 is placed in the shoe bracket 112. When the spring arm (or spring bar) 56 is positioned within the shoe bracket 112, the spring arm (or spring bar) 56 may be generally in direct contact with the friction pad 132. The preload force may result in the spring arm (or spring bar) 56 applying a downward force on the towed vehicle 24 through the attachment assembly 60 and an upward force on the rear of the towing vehicle 28 through the ball mount 48. The magnitude of the preload force may be selected to enhance the effective operation of the towing vehicle 28 by considering factors such as, for example, the relative weights of the cargo and towed vehicle 24 and the anticipated driving conditions.

The downward force of the spring arm (or spring bar) 56 may be relayed to the towed vehicle 24 by the contact of the spring arm (or spring bar) 56 with the friction pad 132 coupled to the shoe bracket 112. Such downward force may assist in distributing weight of the towed vehicle 24 to the towing vehicle 28. The downward force, together with the friction coefficient of the friction pad 132 and the friction in the ball mount 48 (i.e., the friction between the spring arm (or spring bar) 56 and the ball mount 48) may produce a friction force that resists lateral and front-to-back movement of the spring arm (or spring bar) 56 relative to the attachment assembly 60 and the towed vehicle 24. Such resistance may assist in controlling sway of the towed vehicle 24 relative to the towing vehicle 28.

The arrangement of the friction pad 132 and the friction in the ball mount 48 may substantially improve the sway control of the towed vehicle 24 during towing of the towed vehicle 24. As mentioned earlier, the inclusion of a friction pad 132 may create a friction force to resist lateral and front-to-back movement of the spring arm (or spring bar) 56 during towing of the towed vehicle 24. Such a force may be arranged such that the force does not interfere with the intended operations of the towing vehicle 28, such as controlled left and right turning, backing up, etc. The force, however, may dampen or counteract the sway forces encountered during driving of the towing vehicle 28 so as to reduce or eliminate the sway movement of the towed vehicle 24. This sway dampening may be as a result of friction at the second end 108 of the spring arm (or spring bar) 56 and friction within the ball mount 48.

The hitch assembly 20 may allow for a user to selectively control the friction force applied to spring arm (or spring bar) 56 and, thus, control the amount of sway control provided by the hitch assembly 20. By way of a non-limiting example, the preload force of the spring arm (or spring bar) 56 may be increased, which may increase the sway control provided by the hitch assembly 20. Conversely, the preload force on the spring arm (or spring bar) 56 may be decreased, which may decrease the sway control provided by the hitch assembly 20. Often, the conditions that demand a greater preload force on the spring arm (or spring bar) 56 may also demand greater sway control. For example, as the weight of cargo increases, the preferred preload force on the spring arm (or spring bar) 56 may increase to distribute more load to the front of the towing vehicle 28. Similarly, as the weight of cargo increases, the magnitudes of the sway forces may also increase; therefore, increases in sway control may be beneficial.

In the embodiments described and illustrated, when the preload force is increased, the downward force of the spring arm (or spring bar) 56 on the friction pad 132 may increase as well as the forces in the ball mount 48. The increased downward force may increase the friction force that must be overcome for the spring arm (or spring bar) 56 to move laterally or front-to-back. This may provide greater control of sway by dampening and counteracting greater sway forces. The preload force may be increased or decreased in a number of ways. In some embodiments, the height of the shoe bracket 112 relative to the towed vehicle 24 may be adjusted based on specific aligned apertures 144, 148 of the frame bracket 116 and the side bracket 128, through which the shoe bracket 112 is attached. As may be seen in FIG. 1, there may be a plurality of aligned apertures 144, 148 through which the shoe bracket 112 may be attached. The higher the attachment of the shoe bracket 112, the greater the spring arm (or spring bar) 56 must be bent upwards to be placed within the shoe bracket 112. This may result in greater preload force of the spring arm (or spring bar) 56. Conversely, the lower the attachment of the shoe bracket 112, the less the spring arm (or spring bar) 56 must be bent upwards to be placed within the shoe bracket 112. This may result in smaller preload force of the spring arm (or spring bar) 56.

In other embodiments, the attachment assembly 60 may be selectively positioned along the length of the A-frame 36. As will be readily appreciated, as the attachment assembly 60 is moved towards the ball mount 48 (i.e., closer to the first end 64 of the spring arm (or spring bar) 56 and farther away from the second end 108 of the spring arm (or spring bar) 56), the spring arm (or spring bar) 56 may be bent upward a greater distance to be properly seated in the shoe bracket 112. The larger the upward deflection of the spring arm (or spring bar) 56, the larger the sway control provided by the hitch assembly 20. Conversely, as the attachment assembly 60 may be moved away from the ball mount 48 (i.e., closer to the second end 108 of the spring arm (or spring bar) 56 and farther from the first end 64 of the spring arm (or spring bar) 56), the spring arm (or spring bar) 56 may be bent upward a lesser distance to be properly seated in the shoe bracket 112. The lesser the upward deflection of the spring arm (or spring bar) 56, the lesser the sway control may be provided by the hitch assembly 20.

In other embodiments, the spring arms (or spring bars) 56 may be selected based on the stiffness or rigidity of the material comprising the arms (or bars) 56. As will be readily understood, at a given deflection, the preload force provided by the arms (or bars) 56 may vary based on the stiffness or rigidity of the spring arm (or spring bar) material. A spring arm (or spring bar) comprised of a stiffer material may provide a greater preload force at a given deflection than a spring arm (or spring bar) comprised of a more flexible or pliant material.

It will be readily understood that examples of apparatus, systems, and methods described and illustrated herein for increasing or decreasing sway control may also be applied to increase or decrease the distribution of the weight from a towed vehicle 24 to the towing vehicle 28.

As described above, the position of the attachment mechanism 60 along the A-frame member 36 may be variable, which may accommodate a variety of circumstances. The style of towed vehicle 24 and placement of cargo may limit the locations along the A-frame member 36 at which a hitch assembly may be coupled. For example, towed vehicles 24 designed to transport gas tanks often include securing fixtures along the perimeter of the towed vehicle 24. These securing fixtures and the placement of gas tanks in the fixtures often interfere with the placement of spring arm (or spring bar) attachment mechanisms at locations along the A-frame. If the attachment mechanism is statically located along the spring arm, such a condition may preclude a hitch assembly from being used with a towed vehicle transporting gas tanks.

In the embodiments described and illustrated herein, the attachment assembly 60 may be secured anywhere along the A-frame member 36 and still accommodate the spring arm (or spring bar) 56. When the spring arm (or spring bar) 56 is placed on the friction pad 132, it may be free to move (once frictional forces between the friction pad 132 and the spring arm (or spring bar) 56 are overcome) within an enclosure defined by the shoe bracket 112. Such placement of the spring arm (or spring bar) 56 on the friction pad 132 may not be dependent on the location of the attachment assembly 60 to the A-frame member 36.

Figure 19A:
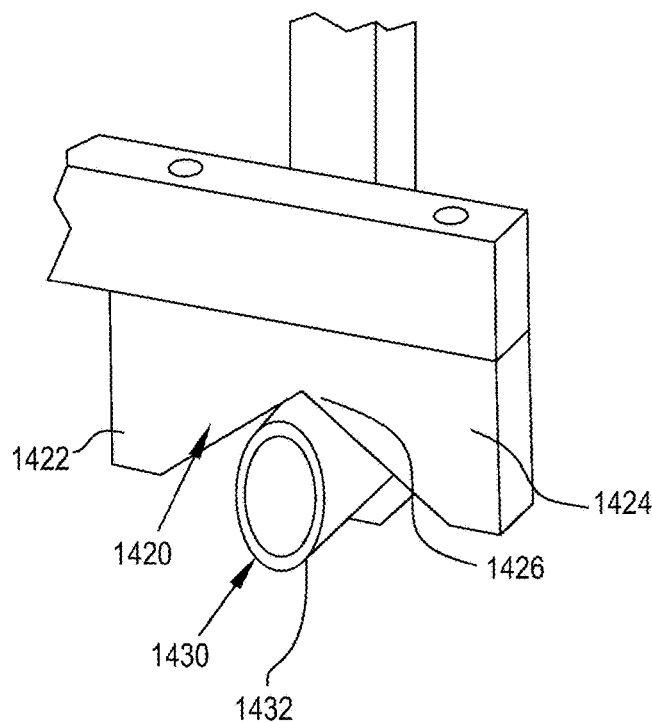
FIGS. 19A-C are illustrations of an embodiment of a mount for use in a weight distribution system to selectively attach a spring arm (or spring bar) to a towed vehicle.
Figure 19B:
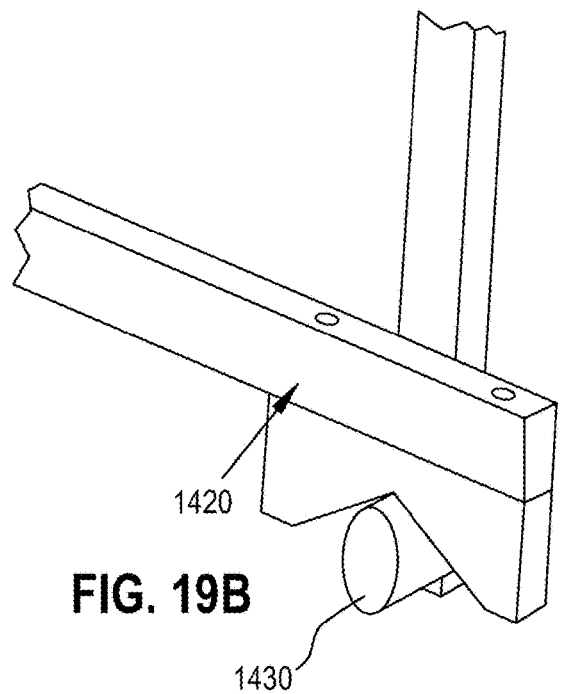
Figure 19C:
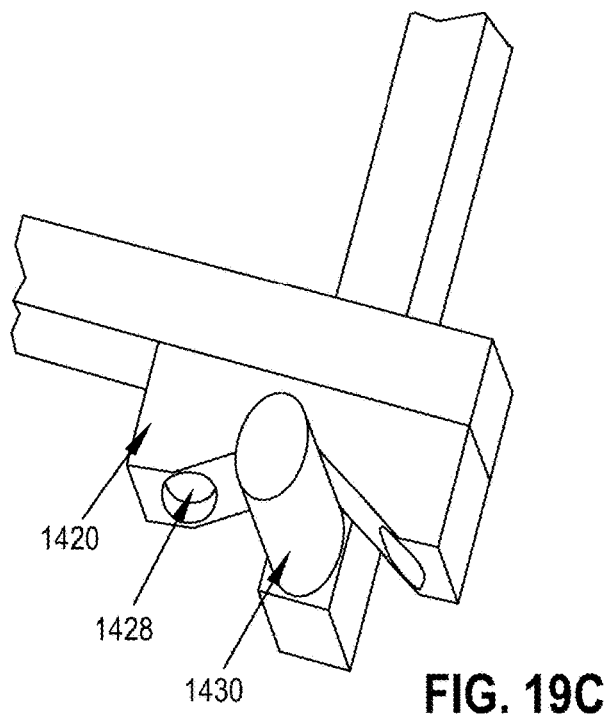
Figure 20:
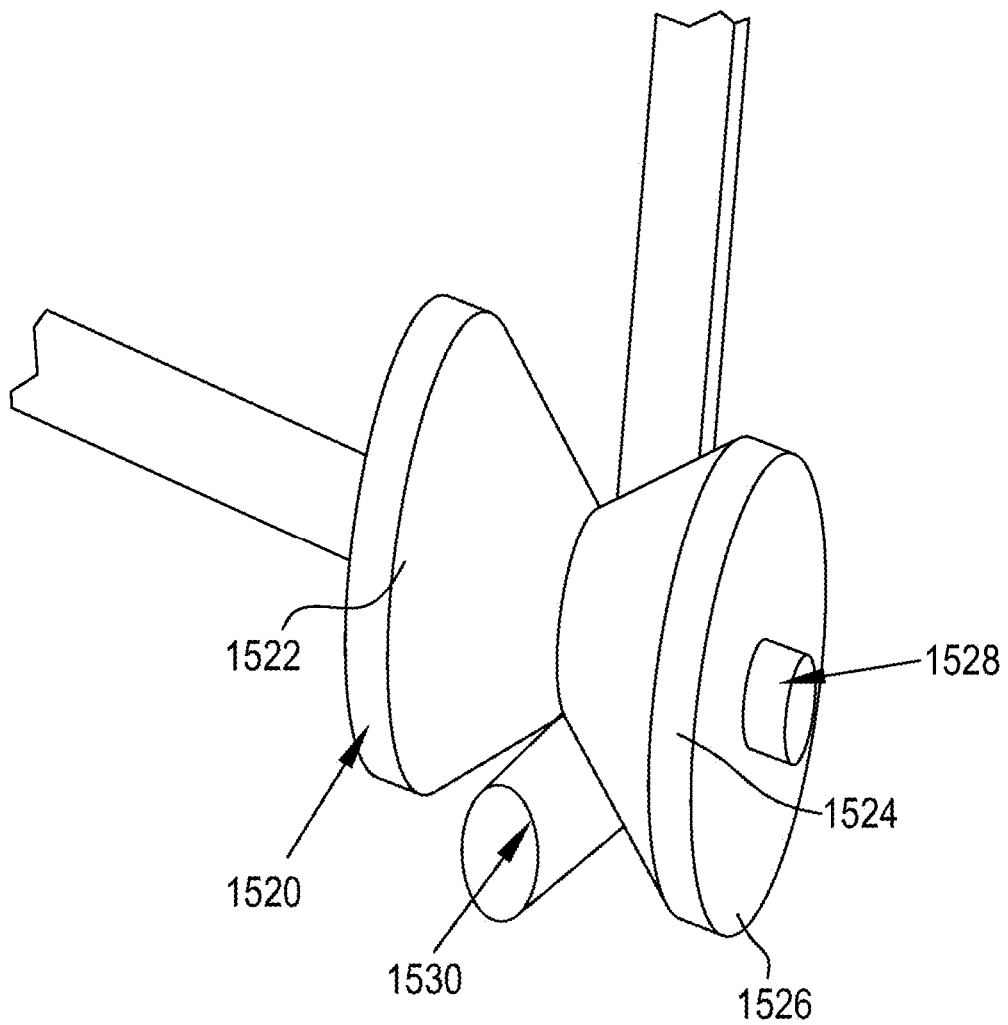
FIG. 20 is an illustration of an embodiment of a mount for use in a weight distribution system to selectively attach a spring arm (or spring bar) to a towed vehicle.

It is noted that various embodiments of attachment assemblies or mounts that selectively attach the spring arms (or spring bars) to the towed vehicle 24, such as to the A-frame member 36, are disclosed herein, such as in FIGS. 19-21, for example.

Figure 5:
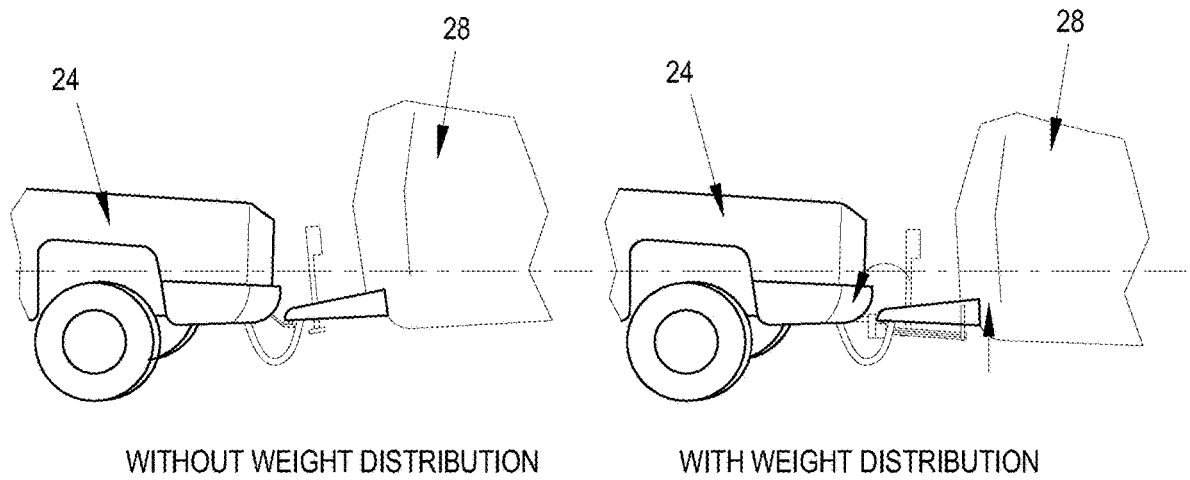
FIG. 5 is an illustration showing a towing vehicle and a towed vehicle both with and without proper weight distribution.
Figure 6:
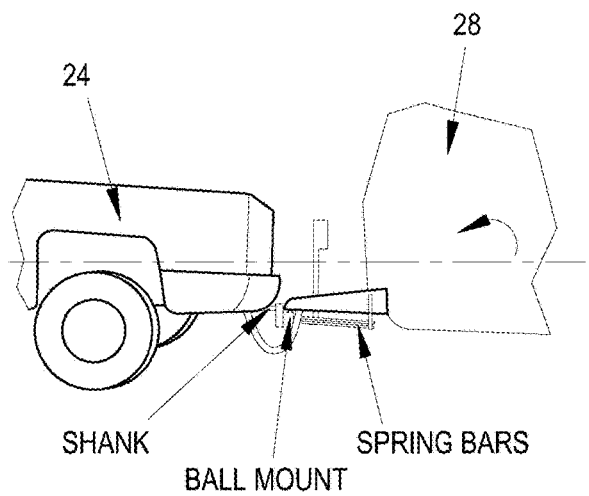
FIG. 6 is an illustration showing how much a towed trailer's pitch necessitates the need for a spring arm (or spring bar) to torque the towing vehicle down.

As noted above, weight distribution systems use spring bars to apply torque through a truck's receiver to counteract the trailer's weight behind the rear axle in order to take weight off a vehicle's the steering wheels, see FIG. 5. As illustrated in FIG. 6, the one or more spring arms, or spring bars, must be strong enough to apply the required torque to the truck while being soft enough to maintain similar load returning (torque) while truck and trailer pitch.

Figure 7:
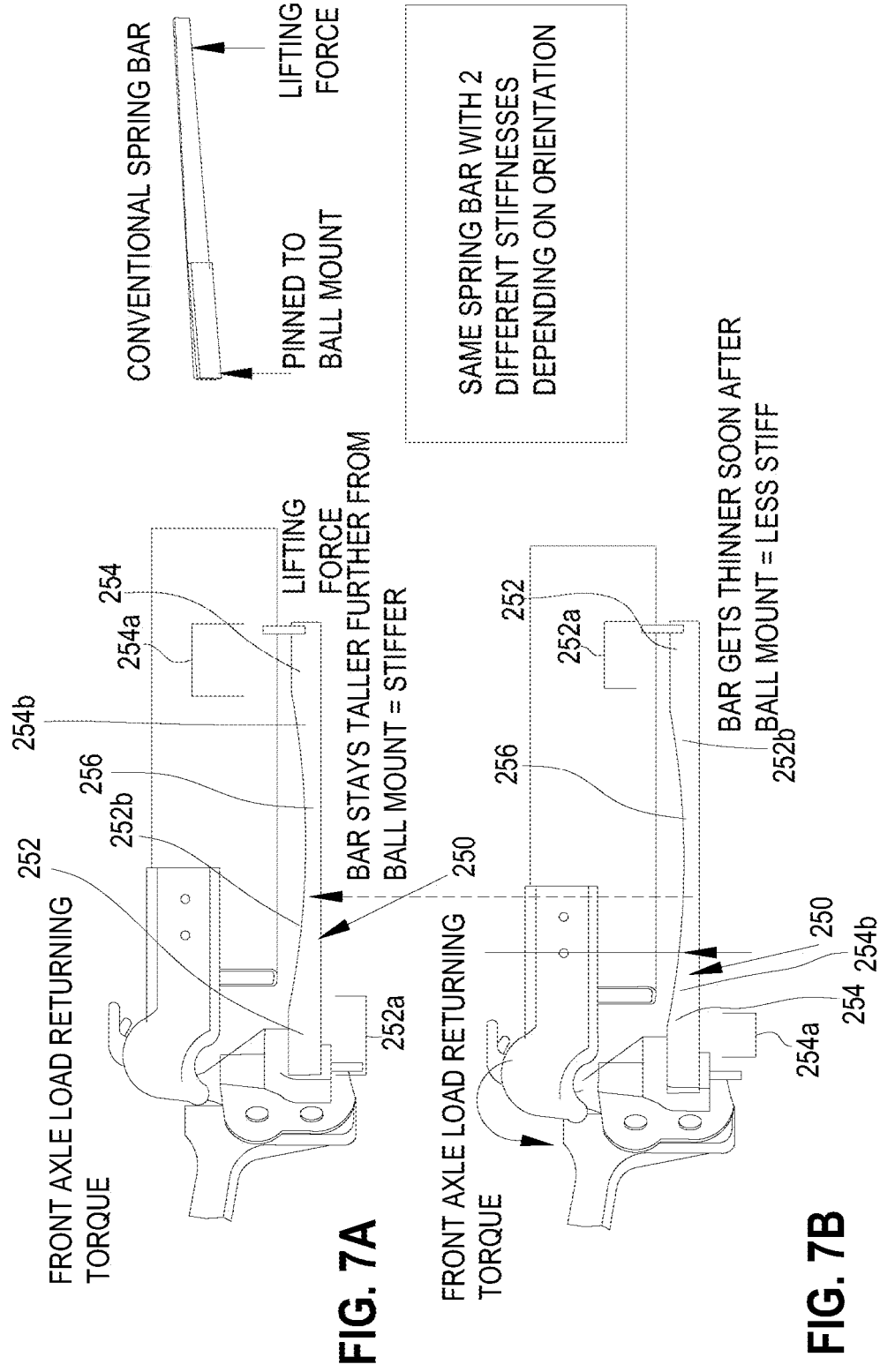
FIGS. 7A-B are illustrations of a variably-shaped spring arm (or spring bar) according to one embodiment of the present invention.

Turning to FIGS. 6 and 7, these figures illustrate a first embodiment of a variable load spring arm (or spring bar) 250 according to one embodiment of the present invention. As can be seen in FIGS. 6 and 7, spring arm (or spring bar) 250 has two differently shaped ends 252 and 254, where the different shapes of ends 252 and 254 permit spring arm (or spring bar) 250 to yield different load returning torques depending upon the orientation of spring arm (or spring bar) 250. Torque is force applied about a lever arm (bending or twisting), where resistance to bending is proportional to the height of the spring arm (or spring bar) 250 to the 3rd power. Thus, in this embodiment, spring arm (or spring bar) 250 is asymmetrical as the design and orientation of ends 252 and 254 differ from one another so that up flipping the orientation of spring arm (or spring bar) 250 in a weight distribution system described herein, e.g. by either coupling end 252 to the towing vehicle 28 and end 254 to the towed vehicle 24 shown in FIG. 7A or coupling end 252 to the towed vehicle 24 and end 254 to the towing vehicle shown in FIG. 7B, results in the ability to achieve different load ratings (i.e., a weight distribution system having at least one variable load rating spring arm (or spring bar) 250).

As can be seen in the two close-ups of spring arm (or spring bar) 250 ends 252 and 254 have similar flat portions 252a and 254a, respectively, but differ in the taper (252b and 254b, respectively) that occurs after the end of each of the flat portions 252b and 254b towards the middle section 256 of spring arm (or spring bar) 250. FIG. 6 also illustrates a conventional spring arm (or spring bar). As shown in FIGS. 7A-B, in an embodiment, tapered portion 252b may be longer than tapered portion 254b. It is also noted that tapered portion 254b may be longer than tapered portion 252b or that tapered portion 252b, 254b may be substantially the same length. As is also illustrated in FIGS. 6 and 7, when end 252 is closest to the ball mount 48 hitch ball 52, spring arm (or spring bar) 250 stays taller or thicker further from the ball mount (e.g., the taper is longer, not as angled, so that the thickness of the spring bar 250 is greater over a longer length compared to end 254) and achieves a stiffer state (i.e., requires more torque to flex). Alternatively, when end 254 is closest to the ball mount 48 or hitch ball 52, spring arm (or spring bar) 250 gets shorter or thinner sooner from the ball mount (e.g., the taper is shorter, more angled, so that the thickness of the spring bar 250 is reduced over a shorter length compared to end 252) and achieves a more flexible state (i.e., is less stiff and thus requires less torque to flex). Thus, an asymmetric spring arm (or spring bar) 250 tapering down in the middle section 256 thereof can have different force-deflection curves depending on which end is fixed and which end is loaded.

Figure 8:
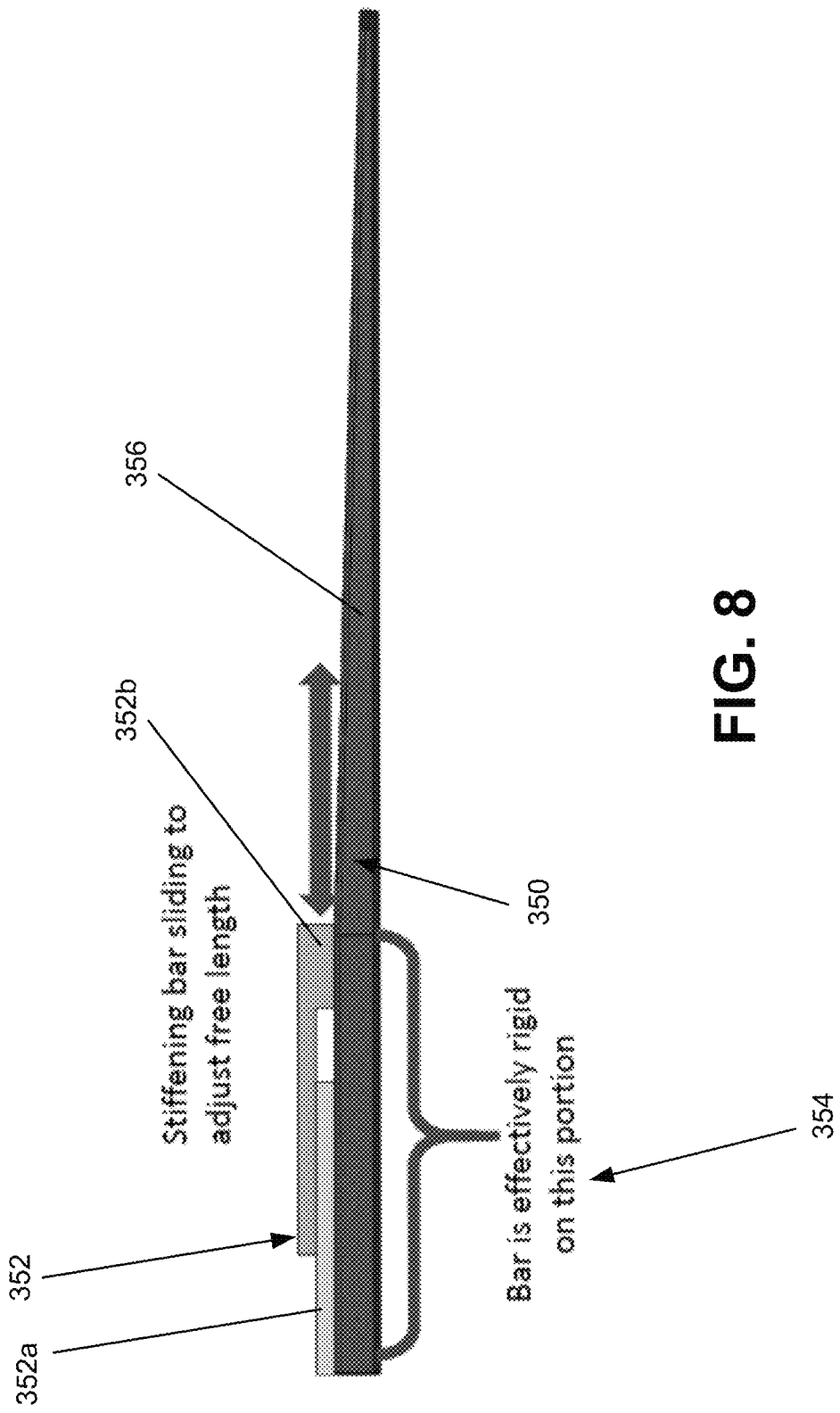
FIG. 8 is an illustration of a tapered spring arm (or spring bar) that has an adjustable stiffening attached thereto to permit such a spring arm (or spring bar) to be adjusted thereby allowing a change in the deflection curve of such an arm, or bar.

Turning to FIG. 8, wherein it discloses a second type of variable load spring arm (or spring bar) 350 according to the present disclosure. In this embodiment, spring arm (or spring bar) 350 has a stiffening bar member 352 that can vary in length in order to effect a change in the effective rigid portion 354 of spring arm (or spring bar) 350 so as to alter the force-deflection curve of spring arm (or spring bar) 350 by changing its free length 356. In one embodiment, stiffening bar member 352 is comprised of a fixed portion 352a and a slidable portion 352b that permits a user to modify the length of stiffening member 352 thereby changing the length of the rigid portion of spring arm (or spring bar) 350. Although not illustrated in FIG. 8, stiffening bar member 352 could optionally have some locking mechanism (e.g., a screw, clasp, etc.) so that the slidability of slidable portion 352b of stiffening bar member 352 can be locked into place. Such an optional feature is desirable so that stiffening bar member 352 does not move, or shift, during towing operations.

Figure 9:
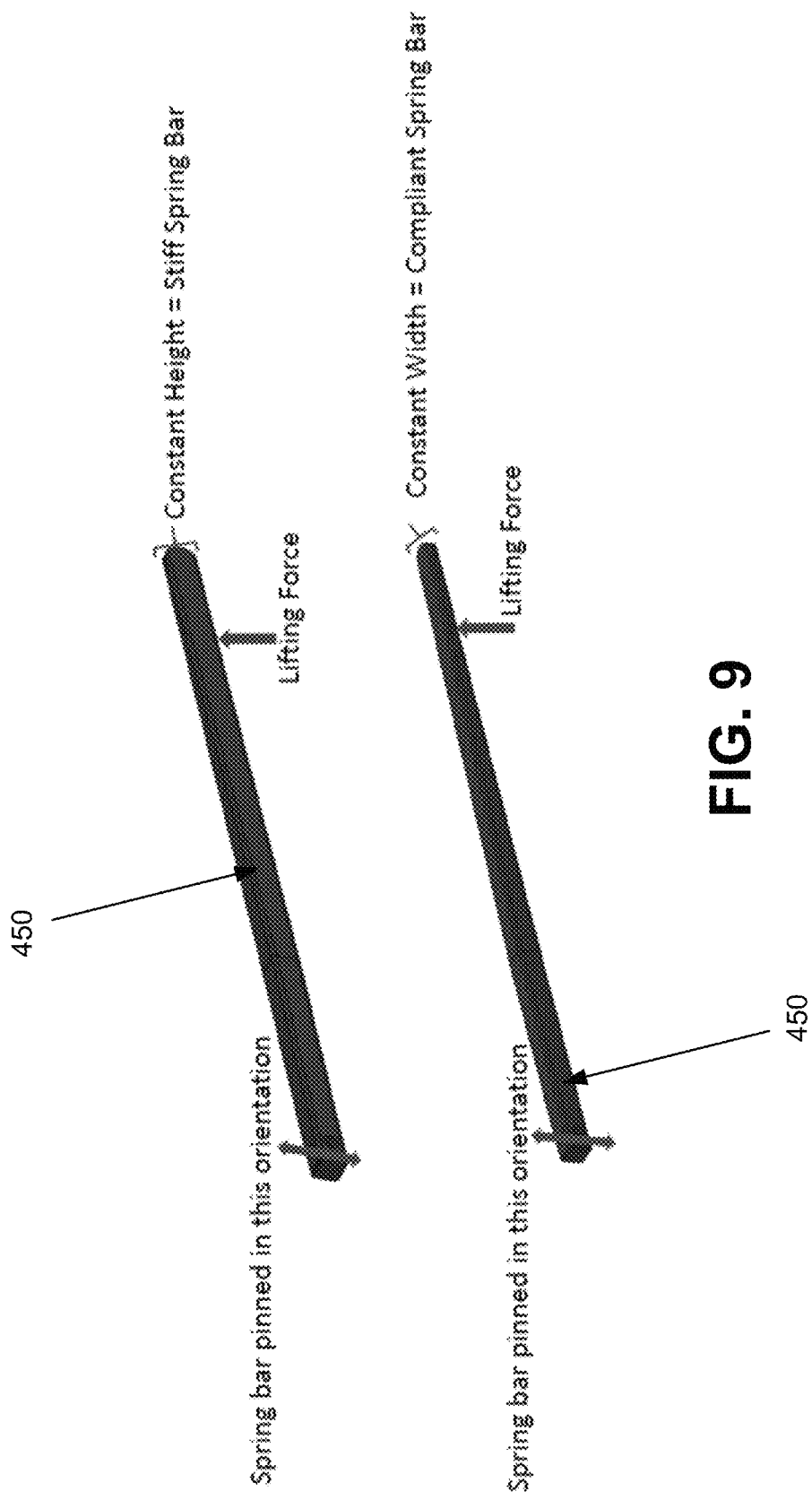
FIG. 9 is an illustration of a tapered spring arm (or spring bar) that is positionable in a multiple of orientations to achieve a different deflection curve.

Turning to FIG. 9, wherein it illustrates yet another embodiment of a variable load spring arm (or spring bar) 450 according to the present disclosure. In this embodiment, spring arm (or spring bar) 450 is oriented, or pinned, in such a manner that it possess a constant height along its entire length thereby providing a stiff spring arm (or spring bar) and a portion of its width that tapers. In a second orientation (i.e., where the spring arm (or spring bar) 450 is rotated 90 degrees), spring arm (or spring bar) 450 is oriented, or pinned, in a manner that it has a constant width but has a portion of its height that tapers. In such embodiments, the spring arm (or spring bar) 450 may include a plurality of apertures that extend therethrough so that the spring arm (or spring bar) 450 may be operatively attached is the ball mount head as described above. By providing a plurality of apertures the spring arm (or spring bar) 450 may attach with the ball mount head in a plurality of different positions. By way of a non-limiting example, the spring arm (or spring bar) 450 may be positioned in the ball mount head in a first orientation and then removed, rotated 90 degrees and inserted back into the ball mount head in a second orientation. While the first and second orientation are described as rotating the spring arm (or spring bar) 450 the present teachings are not limited to this configuration. The spring arm (or spring bar) 450 may be rotated any appropriate amount to be positioned in a first and second orientation, e.g., 45 degrees, 60 degrees, 90 degrees, 120 degrees, 135 degrees and everything therebetween.

Figure 10:
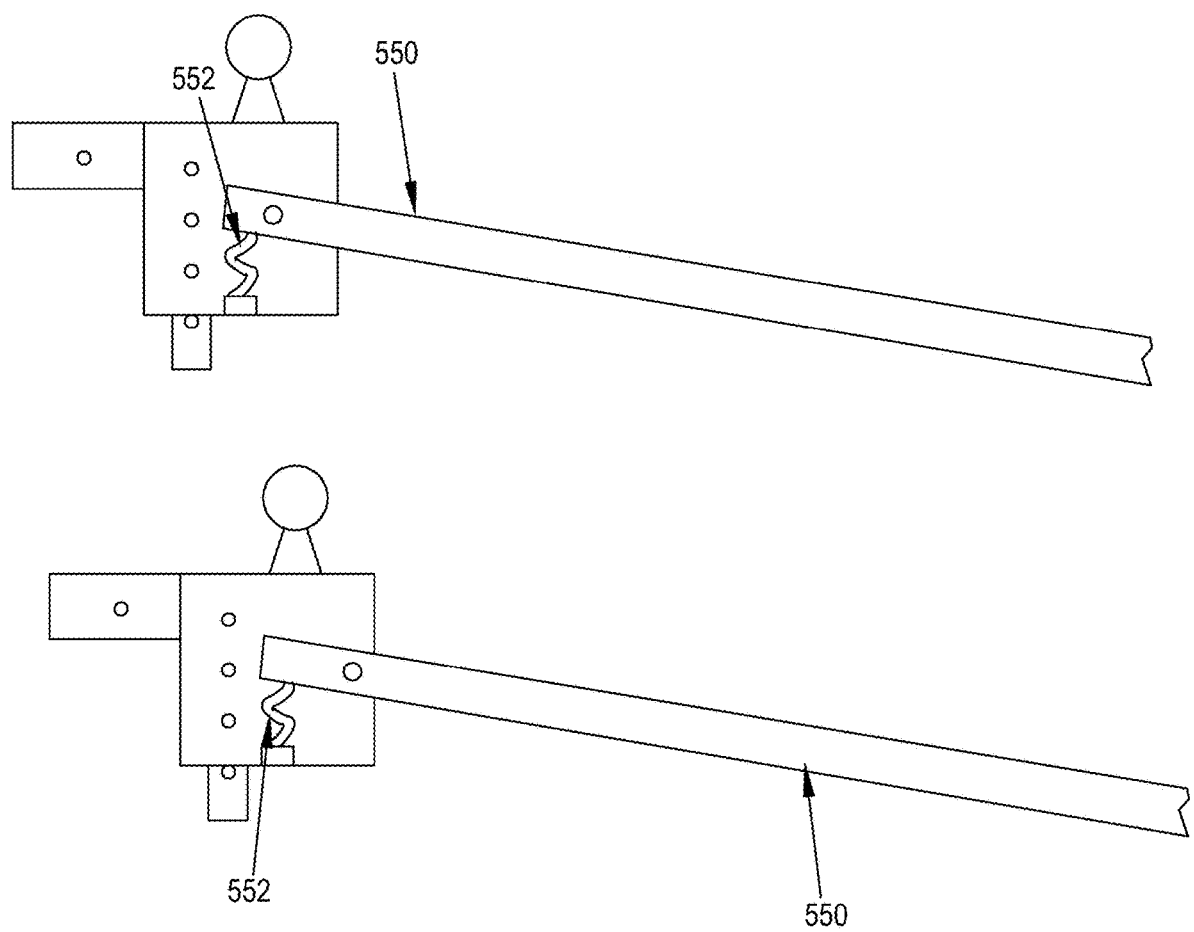
FIG. 10 is an illustration of an embodiment of a weight distribution system that allows for adjustment of a location of a tapered spring arm (or spring bar) to achieve a desired deflection curve.

Turning to FIG. 10, wherein it illustrates yet another embodiment of a weight distributing system that comprises a variable load spring arm (or spring bar) 550 therein. In this embodiment, a rigid or flexible beam 550 can be opposed by a spring 552 to produce torque through the ball mount. Torque can be varied based on springs, spring preload, or lever arm length between the bars and springs. By way of a non-limiting example, the force-deflection curve of the weight distribution system or more specifically for the spring bar 550, can be changed by varying either or both of the spring rate in the spring 552 (or coil spring as shown) and adjusting a pre-load such as in a coil-over spring. In these embodiments, the force-deflection curve of the system can be adjusted in a plurality of ways. In addition to utilizing the spring bars identified in the prior embodiments, the location of the attachment point of the spring bar 550 may be adjusted rearwardly (i.e., toward from the towing vehicle as shown in the top figure) or adjusted forwardly (i.e., away from the towing vehicle as shown in the bottom figure). In addition or in the alternatively, a spring 552 may be utilized. In these embodiments, the spring rate of the spring 552 may be modified in any manner (or more specifically, adjusting the spring load or spring rate) to vary the lever arm force-deflection curve. All of the foregoing may be adjusted or any one of the foregoing may be adjusted to arrive at the desired force-deflection curve for the system.

In light of the above, the present disclosure provides a method by which to create a spring bar that, in one embodiment, can be reversed thereby allowing for two different force-deflection curves on the free end thereof. Different force deflection curves allow the same spring bar to be used with different trailer weights. This can be achieved by any of the following methods: (a) putting a taper between either mounting end but having an asymmetric design as described above relative to a center of the bar, such that the thickness of the bar varies differently from either constrained end, varying the stiffness (see FIGS. 6 and 7); (b) tapering the bar differently along two different 90 degree orientations (in this instance, a "stiff" spring bar would maintain its full height in the dimension on-plane with bending and be tapered thinner in a dimension normal to the bending plane, and a "soft" spring bar would maintain full width in the dimension normal to the bending plane, and taper in the dimension of the bending plane—see FIG. 9); (c) using a sliding or telescoping support that stiffens, widens and/or heightens a certain portion of the spring bar to increase or decrease stiffness of the bar (see, e.g., FIG. 8); and (d) a spring bar or I-beam style mechanism that works as a lever (or against a crank) that actuates a spring (coil spring, air spring, torsion spring, leaf spring) where a user can vary the lever arm and subsequently vary the force-deflection curve at the trailer bracket end of the system (see FIG. 10); and (e) a weight distribution system that has multiple spring bars that lay over each other or next to each other to provide added stiffness with added spring bars.

In light of the above, any weight distribution system disclosed herein may use one or more variable load spring arm (or spring bar) according to any one or more embodiments of the present invention. It should be noted that although the embodiments of FIGS. 1 through 5 illustrate a Y-arrangement that contains two spring arms (or spring bars), the variable load spring arm (or spring bar) according to any one or more embodiments of the present disclosure are not required to be used in solely the weight distribution system disclosed herein, but can be used in place of any one or more spring arm (or spring bar) in any suitable weight distribution system regardless of the overall total number of spring arm (or spring bar) therein.

Turning to FIGS. 11-14, shown are additional embodiments of spring arms (or spring bars). It is noted that any or all of the foregoing aspects of the described systems, such as spring arms 56, 250, 350, 450, etc., attachment assemblies 60, and overall weight distribution systems and hitch assemblies may be combined with the following embodiments without limitations. Further, any or all of the aspects of the following embodiments may be combined with the foregoing aspects of the described systems, such as spring arms 56, 250, 350, 450, etc., attachment assemblies 60, and overall weight distribution systems and hitch assemblies without limitation. Here, and throughout the disclosure, it is further noted that the terms spring arm and spring bar may be used interchangeably.

Figure 11:
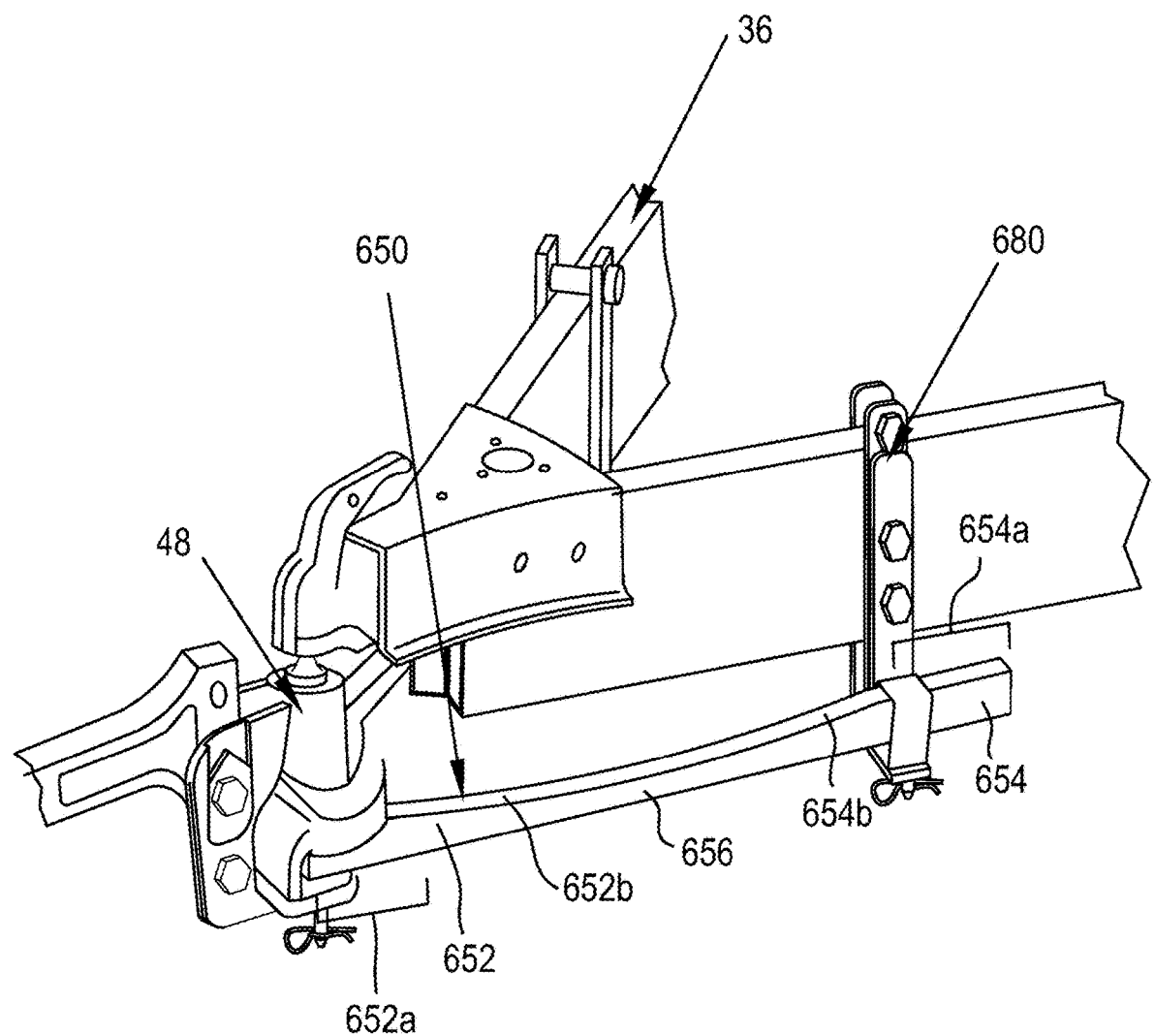
FIG. 11 is an illustration of an embodiment of a weight distribution system including a spring arm (or spring bar)

FIG. 11 shows an embodiment of an asymmetric spring bar 650 or a spring bar 640 including an asymmetrical profile. Spring bar 650 may comprise a first end 652 and a second end 654. In an embodiment, the first end 652 may be differently shaped compared to the second end 654, and vice versa where the second end 654 may be differently shaped compared to the first end 652. In an embodiment, the first end 652 and the second end 654, e.g., the two ends of the spring bar 650, may be asymmetrical.

It is noted that in embodiments where the weight distribution system includes a pair of spring arms, e.g., a first and a second spring bar 650, that this pair of spring bars 650 may be symmetrical, identical, or substantially similar to each other. It is noted that in these embodiments, the "asymmetric" identifier may only refer to the two ends of a single spring bar and not necessarily to two spring bars (or more) within the weight distribution system. The alternative is also herein contemplated. It is noted that in embodiments where the weight distribution system includes a pair of spring arms, e.g., a first and a second spring bar 650, that this pair of spring bars 650 may be asymmetric to each other. It is noted that in these embodiments, the "asymmetric" identifier may both refer to the two ends of a single spring bar and to two spring bars (or more) within the weight distribution system, as well.

Spring bar 650, having an asymmetrical profile, may be able to accommodate mixed loads based on, for example, the portion offset between ends (e.g., narrow portion offset between ends). For example, the different shapes, forms, and thicknesses of ends 652 and 654 of the spring bar 650 may permit the spring bar 650 to yield different load returning torques depending upon the orientation of spring bar 650, e.g., the orientation referring to which end 652, 654 of the spring bar 650 generally connects to the towed vehicle 24 through, for example, the A-frame member 36, and which end 652, 654 of the spring bar 650 generally connects to the towing vehicle 28 through, for example, the ball mount 48 or ball mount. In an example, the spring rate and weight rating can change and be manipulated when changing or deciding which end 652, 654 of the spring bar 650 connects to the ball mount 48. As previously stated in reference to FIGS. 6 and 7, torque is force applied about a lever arm (bending or twisting), where resistance to bending is proportional to the height of the spring bar 650 to the 3rd power, and for an asymmetric spring bar as disclosed herein, where the height at the ball mount 48 and the waist is approximately the same, the height differences at different points along the spring bar that contributes to the weight distribution. Thus, in this embodiment, spring bar 650 is asymmetrical as the design and orientation of ends 652 and 654 differ from one another so that upon flipping the orientation of spring bar 650 in a weight distribution system described herein, e.g. by either coupling end 652 to the towing vehicle 28 and end 654 to the towed vehicle 24 or coupling end 652 to the towed vehicle 24 and end 654 to the towing vehicle, results in the ability to achieve different load ratings (i.e., a weight distribution system having at least one variable load rating spring bar 650). Further, in some embodiments, the spring bar 650 may be configured to be rotated 90 degrees to adjust the load rating thereof. In other embodiments, the spring bar 650 may be rotated 90 degrees and flipped by either coupling end 652 to the towing vehicle 28 and end 654 to the towed vehicle 24 or coupling end 652 to the towed vehicle 24 and end 654 to the towing vehicle. In this embodiment, the spring arm 650 may be positionable in four different orientations to provide four different load ratings.

Spring bar 650 may further comprise a middle section 656 in between the first end 652 and the second end 654. Each end 652, 654 may each further comprise a flat portion 652a and 654a, respectively, and a tapered portion 652b and 654b, respectively, where the flat portion 652a, 654a at each end 652, 654 tapers into the tapered portion 652b, 654b as the spring bar 650 extends towards the middle section 656 of the spring bar 650. The tapered portions 652b and 654b may occur after the end of each of the flat portions 652b and 654b towards the middle section 656 of spring bar 650. The tapered portion 652b, 654b may be in between each respective end 652, 654 and the middle section 656. As shown in FIG. 11, in an embodiment, spring bar 650 ends 652 and 654 may have flat portions 652a and 654a having a substantially similar length, respectively, but may have tapered portions 652b and 654b, respectively, that differ in length. In an embodiment, the taper of the ends 652, 654 of the spring bar 650, and angle and length of the taper thereof, may differ. As shown in FIG. 11, in an embodiment, spring bar 650 ends 652 and 654 may have flat portions 652a and 654a having a substantially similar height or thickness, respectively, but may have tapered portions 652b and 654b, respectively, that reduce the height or thickness of the spring bar 650 to the middle section 656 having a reduced height or thickness. In an embodiment, the flat portions 652a and 654a may be the greatest thickness of the spring bar 650 and the middle section 656 may have the smallest thickness of the spring bar 650. In an embodiment, the tapered portions 652b and 654b may gradually reduce (albeit, at different angles or across different lengths based on the length of the tapered portions 652b and 654b as described here) the thickness of the spring bar 650 from the greater thickness of the flat portions 652a and 654a to the smaller thickness of the middle section 656.

As shown in FIG. 11, in an embodiment, tapered portion 652b may be longer than tapered portion 654b. In an embodiment, tapered portion 652b may be 1-99% longer than tapered portion 654b. In an embodiment, tapered portion 652b may be 25-75% longer than tapered portion 654b. In an embodiment, tapered portion 652b may be double, triple, etc. the length of tapered portion 654b. It is also noted that tapered portion 654b may be longer than tapered portion 652b or that tapered portion 652b, 654b may be substantially the same length. In an embodiment, flat portions 652a, 654a may be substantially the same length as each other 654a, 652a. It is also noted that one of the flat portions 652a, 654a may be longer or shorter than the other flat portion 654a, 652a, and vice versa. The flat portions 652a, 654a may be substantially the same length as either the tapered portions 652b, 654b or may be longer or shorter than either or both the tapered portions 652b, 654b. The middle section 656 may be may be substantially the same length as the flat portions 652a, 654a or may be longer or shorter than the flat portions 652a, 654a. The middle section 656 may be may be substantially the same length as either the tapered portions 652b, 654b or may be longer or shorter than either or both the tapered portions 652b, 654b. The middle section 656 may be may be substantially the same length as either end 652, 654 including flat 652a, 654a and tapered 652b, 654b portions or may be longer or shorter than either or both ends 652, 654 including flat 652a, 654a and tapered 652b, 654b portions. In an embodiment, the ratios and proportions of the tapered portions and flat portions may not be particularly limited except that the flat portions 652a, 654a should be long enough to contact and insert into the ball mount 48. In an embodiment, the middle section 656 may not be flat and elongated, but instead may be more of a middle "point" or "v" where a first downward tapered portion changes into a second upward tapered portion. Additionally, in an embodiment, the middle section 656 or middle point/"v" may not be in the middle of the spring bar 650 per se, and instead may be off center of off-set a center of the spring bar 650.

As is also shown in FIG. 11, when end 652 is closest to the ball mount 48 or hitch ball 52, spring bar 650 stays taller or thicker further from the ball mount (e.g., the taper is longer, not as angled, so that the thickness of the spring bar 650 is greater over a longer length compared to end 654) and achieves a stiffer state (i.e., requires more torque to flex). Alternatively, when end 654 is closest to the ball mount 48 or hitch ball 52, spring bar 650 gets shorter or thinner sooner from the ball mount (e.g., the taper is shorter, more angled, so that the thickness of the spring bar 650 is reduced over a shorter length compared to end 652) and achieves a more flexible state (i.e., is less stiff and thus requires less torque to flex). Thus, an asymmetric spring bar 650 tapering down in and toward the middle section 656 thereof can have different force-deflection curves depending on which end is fixed and which end is loaded.

Figure 12:
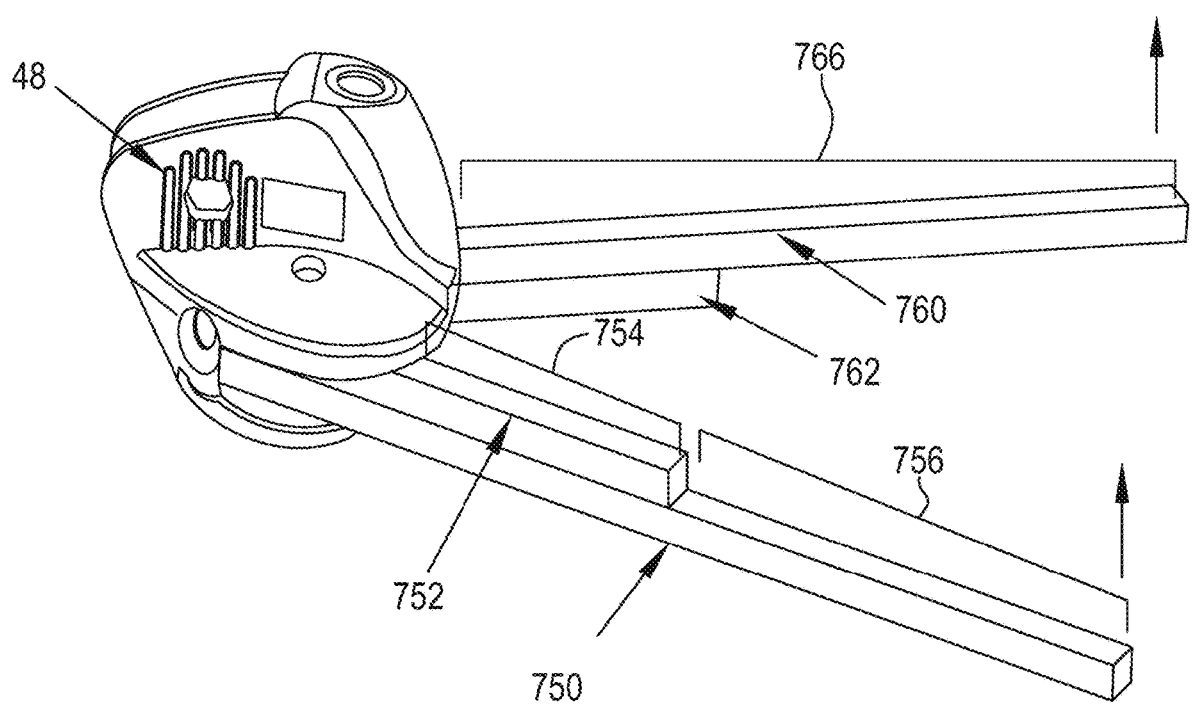
FIG. 12 is an illustration of an embodiment of a weight distribution system including a spring arm (or spring bar)

Turning to FIG. 12, shown is an embodiment of a stackable spring bar 750 or spring bar 750 including one or more stackable leafs or stiffening members 752. It is noted that while FIG. 12 illustrates a second spring bar 760 as a separate reference number from reference number 750, the reference number 750 and other aspects related thereto (e.g. stiffening member 752, rigid portion 754, free end 756, etc.) can refer to one or more (or more than one) spring bars, such as a pair of spring bars, as has been done for prior embodiments, e.g., spring bar 650 for example. Similarly, the reference number 760 and other aspects related thereto (e.g. stiffening member 762, rigid portion 764, free end 766, etc.) can refer to one or more (or more than one) spring bars, such as a pair of spring bars, as has been done for prior embodiments e.g., spring bar 650 for example. The use of two reference numbers here is for convenience to explicitly show an embodiment of a weight distribution system having two spring arms and to illustrate alternative positions of the spring bar 750, 760 and the stiffening members 752, 762. In an embodiment, spring bar 750 and spring bar 760, and the stiffening members 752, 762, are substantially the same or identical. In FIG. 12, spring bar 750 and spring bar 760, and the stiffening members 752, 762, are substantially the same or identical but shown in different orientations relative to the ball mount 48.

In an embodiment, spring bar 750 may include at least one stiffening member 752. The stiffening member 752 can vary in length and/or be transitioned between over/under positions in order to effect a change in the effective rigid portion 754 of spring bar 750 so as to alter the force-deflection curve of spring bar 750 by changing its free length 756. In an embodiment, the stiffening member 752 is non-adjustable or a single, fixed piece. It is noted that the stiffening member may also be adjustable or include one or more slidable portions, see FIG. 8, for example. The stiffening bar member 752 may be attached to the spring bar 750 or ball mount 48 by any appropriate means, including, for example, a screw, clasp, etc. so that the position of stiffening bar member 752 can be locked into place. Such an optional locking may be desirable so that stiffening bar member 752 does not move, or shift, during towing operations. It is noted that these described aspects may similarly apply to spring bar 760 and stiffening member 762.

In an embodiment, the stiffening member 752 may be of any desired length or of varying length depending on the desired length of the effective rigid portion 754 and free length 756 of the spring bar 750. In an embodiment, the length of the stiffening member 752 may be approximately half or less then half of the length of the spring bar 750. In an embodiment, the length of the stiffening member 752 may be approximately half or less than half of the length of the spring bar 750. In an embodiment, the length of the stiffening member 752 may be approximately half or more than half of the length of the spring bar 750. In an embodiment, the length of the stiffening member 752 may be between approximately one fourth of the length of the spring bar 750 and approximately less than half of the length of the spring bar 750. It is noted that these described aspects may similarly apply to spring bar 760 and stiffening member 762.

As shown in FIG. 12, the stiffening member 752, 762 may be positioned either on top of or underneath the spring bar 750, 760. For example, the stiffening member 752 may be positioned on top of the spring bar 750, see FIG. 12. For example, the stiffening member 762 may be positioned on underneath the spring bar 760, see FIG. 12. In an embodiment, the stiffening member 752, 762 may be selectively transitioned between the over and under positions by rotation of the spring bar 750, 760 approximately 180 degrees. In such embodiment, the face of the stiffening member 752, 762 and the face of the spring bar 750, 760 that contact each other may remain the same in both the over and under positions since it is the entire spring bar 750, 760 and stiffening member 752, 762 that may be selectively rotated between positions. In an embodiment, the stiffening member 752, 762 may remain connected or attached to the spring bar 750, 760 as the spring bar 750, 760 is rotated. Rotation of the spring bar 750, 760 may occur at the point of attachment or coupling to the ball mount 48 and around an axis defined by the length of the spring bar 750, 760. It is noted that other types of transitions between over and under positions are also considered and disclosed, for example, the manual placement and detachment/reattachment of the stiffening member 752, 762 onto the spring bar 750, 760 such that the spring bar spring bar 750, 760 may be fixed (not rotatable) and the stiffening member 752, 762 may contact a different face of the spring bar 750, 760, the spring bar 70, 760 may contact a different face of the stiffening member 752, 762, or both.

It is noted that in embodiments having more than one spring bar, e.g., a pair of spring bars 750, 760 both spring bars 750, 760 and stiffening members 752, 762 should be placed in the same orientation, i.e. where the first stiffening member 752 is over the first spring bar 750 and the second stiffening member 762 is over the second spring bar 760 or where the first stiffening member 752 is under the first spring bar 750 and the second stiffening member 762 is under the second spring bar 760. FIG. 12 shows the opposite orientations of the spring bars 750, 760 for convenience in showing and comparing the two orientations in the same image. The same orientation of the spring bars 750, 760 and respective stiffening members 752, 762 can help to ensure consistent towing and weight distribution of the towing vehicle 28 to the towed vehicle 24. It is noted that opposite orientations are also considered and disclosed where the spring bars 750, 760 and stiffening members 752, 762 are positioned in opposite orientations as shown in FIG. 12.

The stiffening member 752 can vary in length and/or be transitioned between over/under positions in order to effect a change in the effective rigid portion 754 of spring bar 750 so as to alter the force-deflection curve of spring bar 750 by changing its free length 756. For example, in an over position as shown in respect to spring bar 750 in FIG. 12 where the stiffening member 752 is positioned on top of the spring bar 750, the effective rigid portion 754 is essentially the length of the stiffening member 752 and the free length 756 is essentially the length of the spring bar 750 that is not connected to or extends from the end of the stiffening member 752. In an embodiment, the position of the stiffening member 752 above the spring bar 750 creates a more rigid/less flexible spring bar 750. For example, in an under position as shown in respect to spring bar 760 in FIG. 12 where the stiffening member 762 is positioned on top of the spring bar 760, entire length of the spring bar 760 is the free length 766, regardless of the length of the stiffening member 762, and the spring bar 760 is less rigid/more flexible. In an embodiment, there is no effective rigid portion or increased effective rigid portion of spring bar 760 with the stiffening member 762 attached below the spring bar 760 than there would be if only the spring bar 760 were present and the stiffening member 762 was unattached. With the stiffening member 762 below the spring bar 760, the stiffening member 762 does not make the spring bar 760 more rigid. The spring rate and weight rating can change and be manipulated when changing or deciding whether the stiffening member 752, 762 will be positioned above or below the spring bar 750, 760, e.g., when rotating the spring bars 750, 760 and stiffening members 752, 762 approximately 180 degrees.

The stiffening member 752, 762 can serve as a "helper leaf" to bear all or part of the load when the stiffening member 752, 762 is positioned on top of the spring bar 750, 760 or may not be used to bear the load when the stiffening member 752, 762 is positioned under or beneath the spring bar 750, 760. When in an under position, the full length of the spring bar 750, 760 may be flexible. When in an over position, at least a portion of the spring bar 750, 760 may be rigid.

Figure 14A:
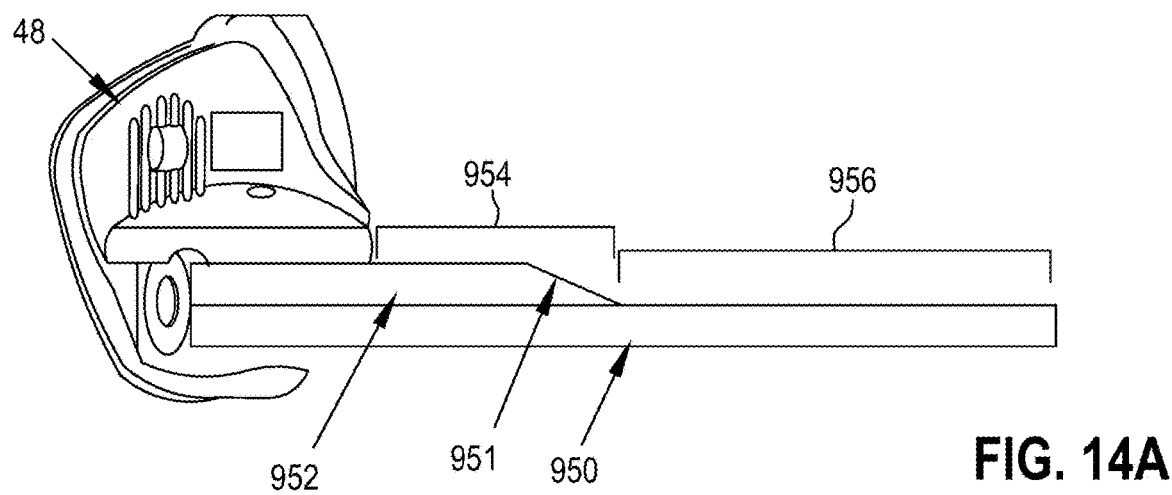
FIGS. 14A-B are illustrations of an embodiment of a weight distribution system including a spring arm (or spring bar)
Figure 14B:
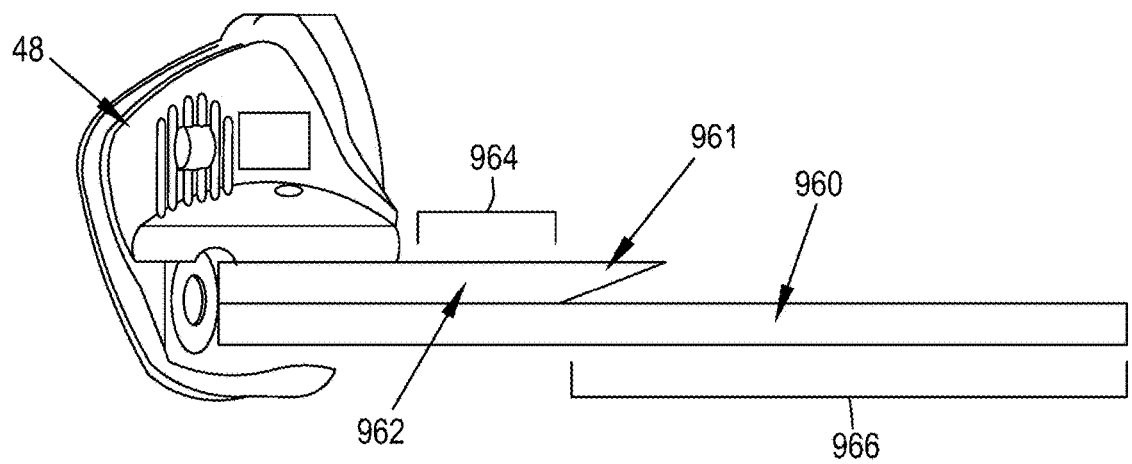

FIGS. 14A-B show an embodiment of a stackable spring bar 950 or spring bar 950 including one or more stackable leafs or stiffening members 952. It is noted that while FIG. 14A-B illustrates a second spring bar 960 as a separate reference number from reference number 950, the reference number 950 and other aspects related thereto (e.g. stiffening member 952, rigid portion 954, free end 956, etc.) can refer to one or more (or more than one) spring bars, such as a pair of spring bars, as has been done for prior embodiments, e.g., spring bar 650 for example. Similarly, the reference number 960 and other aspects related thereto (e.g. stiffening member 962, rigid portion 964, free end 966, etc.) can refer to one or more (or more than one) spring bars, such as a pair of spring bars, as has been done for prior embodiments e.g., spring bar 650 for example. The use of two reference numbers here is for convenience to explicitly show an embodiment of a weight distribution system and to illustrate alternative positions of the spring bar 950, 960 and the stiffening members 952, 962. In an embodiment, spring bar 950 and spring bar 960, and the stiffening members 952, 962, are substantially the same or identical. In FIGS. 14A-B, spring bar 950 and spring bar 960, and the stiffening members 952, 962, are substantially the same or identical but shown in different orientations relative to the ball mount 48.

In an embodiment, spring bar 950 may include at least one stiffening member 952. The stiffening member 952 can vary in length and/or be transitioned between more rigid/less rigid positions in order to effect a change in the effective rigid portion 954 of spring bar 950 so as to alter the force-deflection curve of spring bar 950 by changing its free length 956. In an embodiment, the stiffening member 952 is non-adjustable or a single, fixed piece. It is noted that the stiffening member may also be adjustable or include one or more slidable portions, see FIG. 8, for example. The stiffening bar member 952 may be attached to the spring bar 950 or ball mount 48 by any appropriate means, including, for example, a screw, clasp, etc. so that the position of stiffening bar member 952 can be locked into place. Such an optional locking may be desirable so that stiffening bar member 952 does not move, or shift, during towing operations. It is noted that these described aspects may similarly apply to spring bar 960 and stiffening member 962 shown in FIG. 14B.

In an embodiment, the stiffening member 952 may be of any desired length or of varying length depending on the desired length of the effective rigid portion 954 and free length 956 of the spring bar 950. In an embodiment, the length of the stiffening member 952 may be approximately half or less then half of the length of the spring bar 950. In an embodiment, the length of the stiffening member 952 may be approximately half or less than half of the length of the spring bar 950. In an embodiment, the length of the stiffening member 952 may be approximately half or more than half of the length of the spring bar 950. In an embodiment, the length of the stiffening member 952 may be between approximately one fourth of the length of the spring bar 750 and approximately less than half of the length of the spring bar 950. It is noted that these described aspects may similarly apply to spring bar 960 and stiffening member 962.

As shown in FIG. 12, the stiffening member 952, 962 may further include a tapered portion 951, 961. The tapered portion 951, 961 may be positioned facing away from the spring bar 950, 960 (FIG. 14A) or facing towards the spring bar 950, 960 (FIG. 14B). For example, the stiffening member 952 may be positioned on top of the spring bar 950 so that the tapered portion 951 faces away from the spring bar 950, see FIG. 14A. For example, the stiffening member 962 may be positioned on top of the spring bar 960 so that the tapered portion 961 faces towards the spring bar 960, see FIG. 14B. In an embodiment, the stiffening member 952, 962 may be selectively transitioned between the facing away/facing towards positions by reorienting the stiffening member 952, 962 approximately 180 degrees. It is noted that in such embodiment, the spring bar 950, 960 need not be reoriented and may remain unmoved as the stiffening member 951, 961 is moved between positions.

It is noted that in embodiments having more than one spring bar, e.g., a pair of spring bars 950, 960 both spring bars 950, 960 and stiffening members 952, 962 should be placed in the same orientation, i.e. where the first stiffening member 952 has its tapered portion 951 facing away from the first spring bar 950 and the second stiffening member 962 has its tapered portion 961 facing away from the second spring bar 960 or where the first stiffening member 952 has its tapered portion 951 facing toward the first spring bar 950 and the second stiffening member 962 has its tapered portion 961 facing toward the second spring bar 960. FIG. 14A-B show the opposite orientations of the spring bars 950, 960 for convenience in showing and comparing the two orientations. The same orientation of the spring bars 950, 960 and respective stiffening members 952, 962 can help to ensure consistent towing and weight distribution of the towing vehicle 28 to the towed vehicle 24. It is noted that opposite orientations are also considered and disclosed where the stiffening members 952, 962 are positioned in opposite orientations.

The stiffening member 952, 962 and the tapered portions 951, 961 can vary in length and/or be transitioned between facing away/facing toward positions in order to effect a change in the effective rigid portion 954, 964 of spring bar 950, 960 so as to alter the force-deflection curve of spring bar 950, 960 by changing its free length 956. For example, in facing away position as shown in respect to spring bar 950 in FIG. 14A where the tapered portion 951 of the stiffening member 952 faces away from the spring bar 950, a longer length of the stiffening member 952 contacts the spring bar 950, so that the effective rigid portion 954 includes the tapered portion 951 and is essentially the length of the entire stiffening member 952, while the free length 956 is essentially the length of the spring bar 950 that is not connected to or that extends from the end of the stiffening member 952. In an embodiment, the position of the stiffening member 952 with the tapered portion 951 facing away from the spring bar 950 creates a more rigid/less flexible spring bar 950 (compared to the other position shown in FIG. 14B). For example, in facing toward position as shown in respect to spring bar 960 in FIG. 14B where the tapered portion 961 of the stiffening member 962 faces toward the spring bar 960, a shorter length of the stiffening member 962 contacts the spring bar 960, so that the effective rigid portion 964 does not include the tapered portion 961 and is essentially the length of the stiffening member 962 less the tapered portion 961, while the free length 966 includes the tapered portion 961 and is essentially the length of the spring bar 960 that is not connected to or that extends from the end of the stiffening member 962. In an embodiment, the position of the stiffening member 962 with the tapered portion 961 facing toward the spring bar 960 creates a less rigid/more flexible spring bar 960 (compared to the other position shown in FIG. 14A). The spring rate and weight rating can change and be manipulated when changing or deciding whether the tapered portion 951, 961 of the stiffening member 952, 962 will be positioned in a facing away or facing toward position relative the spring bar 950, 960.

Figure 13A:
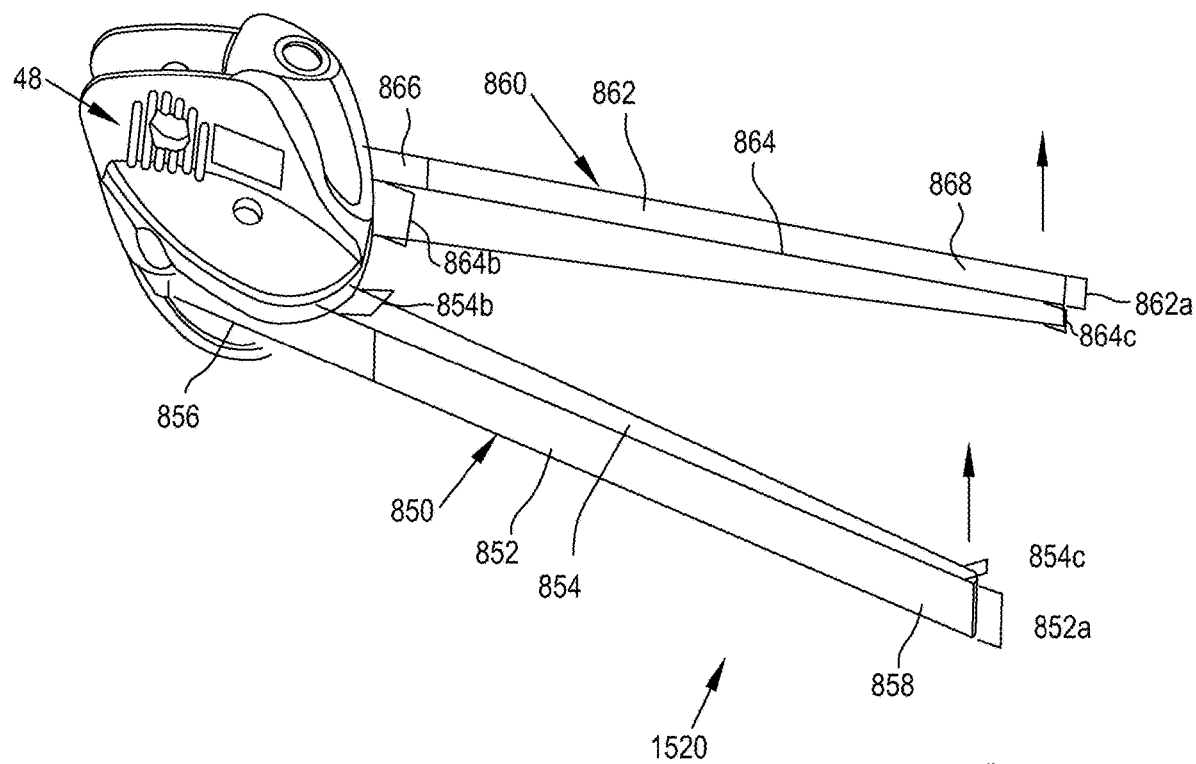
FIGS. 13A-B are illustrations of an embodiment of a weight distribution system including a spring arm (or spring bar)
Figure 13B:
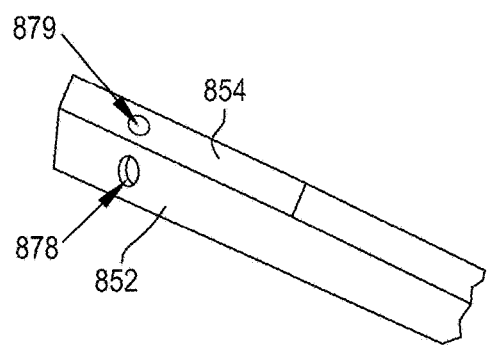

Turning to FIGS. 13A-B, shown is an embodiment of a spring bar 850 that is positionable either to have a constant height and variable width or a constant width and a variable height. It is noted that while FIG. 13A illustrates a second spring bar 860 as a separate reference number from reference number 850, the reference number 850 and other aspects related thereto (e.g. width 852, height 854, etc.) can refer to one or more (or more than one) spring bars, such as a pair of spring bars, as has been done for prior embodiments, e.g., spring bar 650 for example. Similarly, the reference number 860 and other aspects related thereto (e.g. width 862, height 864, etc.) can refer to one or more (or more than one) spring bars, such as a pair of spring bars, as has been done for prior embodiments e.g., spring bar 650 for example. The use of two reference numbers here is for convenience to explicitly show an embodiment of a weight distribution system having two spring arms and to illustrate alternative positions of the spring bar 850, 860. In an embodiment, spring bar 850 and spring bar 860 are substantially the same or identical. In FIG. 13A, spring bar 850 and spring bar 860 are substantially the same or identical but shown in different orientations relative to the ball mount 48.

As shown in FIG. 13A, spring bar 850 comprises a first face 852 having a constant size 852a across the length of the spring bar 850 (e.g. from a first end 856 to a second end 868 of the spring bar 850) and a second face 854 having a variable size 854b/c across the length of the spring bar 850 (e.g. from the first end 856 to the second end 868 of the spring bar 850). In an embodiment, the second face 854 has a tapered shape which forms the variable size 854b/c. In an embodiment, the second face 854 is tapered across the length of the spring bar 850 from a first width 854b (e.g. at the first end 856 of the spring bar 850) to a second width 854c (e.g. at the second end 858 of the spring bar 850), wherein the second width 854c is smaller than the first width 854b. In an embodiment, the first width 854b may be double or more than the second width 854c, for example. In an embodiment, the first width 854b may be three times or more than the second width 854c, for example. In an embodiment, the width 852a of the first face 852 may be constant or the same at the first end 856 and the second end 858. In an embodiment, the width 852a of the first face 852 may be the same as or substantially similar to the first width 854*b* of the second face 854. In an embodiment, the width 852*a* of the first face 852 may be different, either greater or smaller, than the first width 854*b* of the second face 854. In an embodiment, the width 852*a* of the first face 852 may be double or more than the second width 854*c* of the second face 854, for example. In an embodiment, the width 852*a* of the first face 852 may be three times or more than the second width 854*c* of the second face 854, for example.

Although the term size or width may be used herein to describe the constant or variable shape of the first face 852 and the second face 854, it is noted that these terms may be interchangeable and may also be referred to as the height or length of the face, but generally are meant to refer to the size or shape of the respective faces 852, 854 of the spring bar 850. When the spring bar 850 is inserted into the ball mount 48, these terms width, height, length, etc. may refer to the orientation of the spring bar 850 to the ball mount 48, e.g., the outward/inward facing sides may be referred to as the height and the upward/downward facing sides may be referred to as the width, see FIG. 9 and FIG. 13A for example. It is noted that these described aspects may similarly apply to spring bar 860 and aspects thereof, including first face 862 having a constant width 862*a* and second face 864 having a variable or tapered width 864*b/c* from a first end 866 to a second end 868 of the spring bar 860.

It is noted that spring bar 850 further includes a side (not shown) opposite the first 852 and a side (not shown) opposite the second face 854 where each opposite side is the same size (whether constant or variable) as the side, e.g. the first face 852 or the second face 854, that each opposite side is opposite from. Opposite sides may generally be identical in size and shape. Spring bar 850 may generally include four sides so that each cross-section of the spring arm is a rectangle. Cross-sections of the spring bar 850 taken along different lengths of the spring bar 850 may be different in size due to the varying or tapering size of the opposite sides, e.g., 854, having a variable size across the length of the spring bar 850. For example, a cross-section at first width 854*b* at the first end 856 of the spring bar 850 may be a larger rectangular shape than a cross-section at second width 854*c* at the second end 568 of the spring bar 850. In an embodiment, all cross-sections taken along the spring bar 850 may be different and the widths of the variable face 854 may similarly be different across the entire spring bar 850. In an embodiment, the variable face 854 may have no constant portion having the same width. In an embodiment, the variable face 854 may have a constant portion having the same width (such as a flat portion as described in reference to FIGS. 7 and 11) and may then include a tapered portion as described. It is noted that these described aspects may similarly apply to spring bar 860 and aspects thereof, including first face 862 having a constant width 862*a* and second face 864 having a variable or tapered width 864*b/c* from a first end 866 to a second end 868 of the spring bar 860.

In an embodiment, the first end 856 of the spring bar 850 is selectively attachable of coupled to the ball mount 48, for example, or similar component thereof related to the towing vehicle 28. In an embodiment, the second end 858 of the spring bar is selectively mountable or coupled to the towed vehicle 24, e.g., by attachment to the A-frame member 36 or similar component thereof related to the towed vehicle 24. It is noted that the first end 856 having the greater size (e.g. larger size 854*b* of the variable face 854) is used for coupling to the towing vehicle 28 and that the second end 858 having the smaller size (e.g. reduced size 854*c* of the variable face 854) is used for mounting to the towed vehicle 24). The opposite is also considered and disclosed herein. In an embodiment, the spring bar 850 may be oriented or coupled to the ball mount 48 in two different ways. It is noted that these described aspects may similarly apply to spring bar 860 and aspects thereof, including first face 862 having a constant width 862*a* and second face 864 having a variable or tapered width 864*b/c* from a first end 866 to a second end 868 of the spring bar 860.

In a first position shown in reference to spring bar 850 in FIG. 13A, the spring arm 850 may be oriented or coupled in such a manner that it possess a constant height (e.g., first face 852 having a constant size 852*a* at the first end 856 and at the second end 858, faced outwardly/inwardly perpendicular to the ground) along its entire length thereby providing a stiff or more rigid/less flexible spring bar and all or a portion of its width that tapers (e.g., second face 854 having a first size 854*b* at the first end 856 and a second different and smaller size 854*c* at the second end 858, faced upward/downward and parallel to the ground). Spring bar 860 may similarly be positioned in this orientation. This first position may be understood and referred to as a tall, narrow spring bar. In a second position shown in reference to spring bar 860 in FIG. 13A, the spring arm 860 may be oriented or coupled in such a manner that it possess a constant width (e.g., first face 862 having a constant size 852*a* at the first end 866 and at the second end 868, faced upward/downward and parallel to the ground) along its entire length thereby providing a less rigid or more flexible spring bar and all or a portion of its height that tapers (e.g., second face 864 having a first size 864*b* at the first end 866 and a second different and smaller size 864*c* at the second end 868, faced outwardly/inwardly perpendicular to the ground). Spring bar 850 may similarly be positioned in this orientation. This second position may be understood and referred to as a short, wide spring bar. Effectively, the two orientations may change which of the constant (e.g. 852, 862) or variable faces (854, 864) is upward/downward and which of the constant (e.g. 852, 862) or variable faces (854, 864) is therefore the opposite of inward/outward, and vice versa, when coupled to the towed 24 and towing 28 vehicles.

As shown in FIG. 13B, the spring bar 850, 860 may include dual pin directions and each of the constant (e.g. 852, 862) or variable faces (854, 864) may include a pin receiver 878, 879 respectively, configured to receive a pin, for example, or another type of fastener as desired. The pin receiver 878, 879 may extend through the entire depth of the spring bar 850, 860 to the opposite face, or may extend partially through the spring bar 850, 860. The pin, for example, may be inserted through the ball mount 48 and into the pin receiver 878, 879. The pin may further extend out of the spring bar 850, 860 and back through the ball mount 48. The pin may be secured on each end, by any appropriate means, including, for example, a bolt. The pin and pin receiver 878, 879 may generally secure the spring bar 850, 860 to the ball mount 48 but allow for the rigidity/free spring of the spring bar 850, 860 depending on which position the spring bar 850, 860 is oriented in. The spring bar 850, 860 may also be rotatable 90 degrees to transition between the first and second positions and to change the direction of the constant (e.g. 852, 862) and variable faces (854, 864). The spring rate and weight rating can change and be manipulated when changing or deciding whether the orientation of the constant (e.g. 852, 862) and variable faces (854, 864) of the spring bars 850, 860 e.g., when rotating the spring bars 850, 860 approximately 90 degrees.

It is noted that in embodiments having more than one spring bar, e.g., a pair of spring bars 850, 860 both spring bars 850, 860 should be placed in the same orientation, i.e. where the constant face 852, 862 is placed as a constant height outward/inwardly and the variable face 854, 864 is placed as a variable width upwardly/downwardly (e.g. shown as spring bar 850 in FIG. 13A) or where the constant face 852, 862 is placed as a constant width upwardly/downwardly and the variable face 854, 864 is placed as a variable height outward/inwardly (e.g. shown as spring bar 860 in FIG. 13A). FIG. 13 shows the opposite orientations of the spring bars 850, 860 for convenience in showing and comparing the two orientations in the same image. The same orientation of the spring bars 850, 860 can help to ensure consistent towing and weight distribution of the towing vehicle 28 to the towed vehicle 24. It is noted that opposite orientations are also considered and disclosed where the spring bars 850, 860 are positioned in opposite orientations as shown in FIG. 13A.

Figure 15:
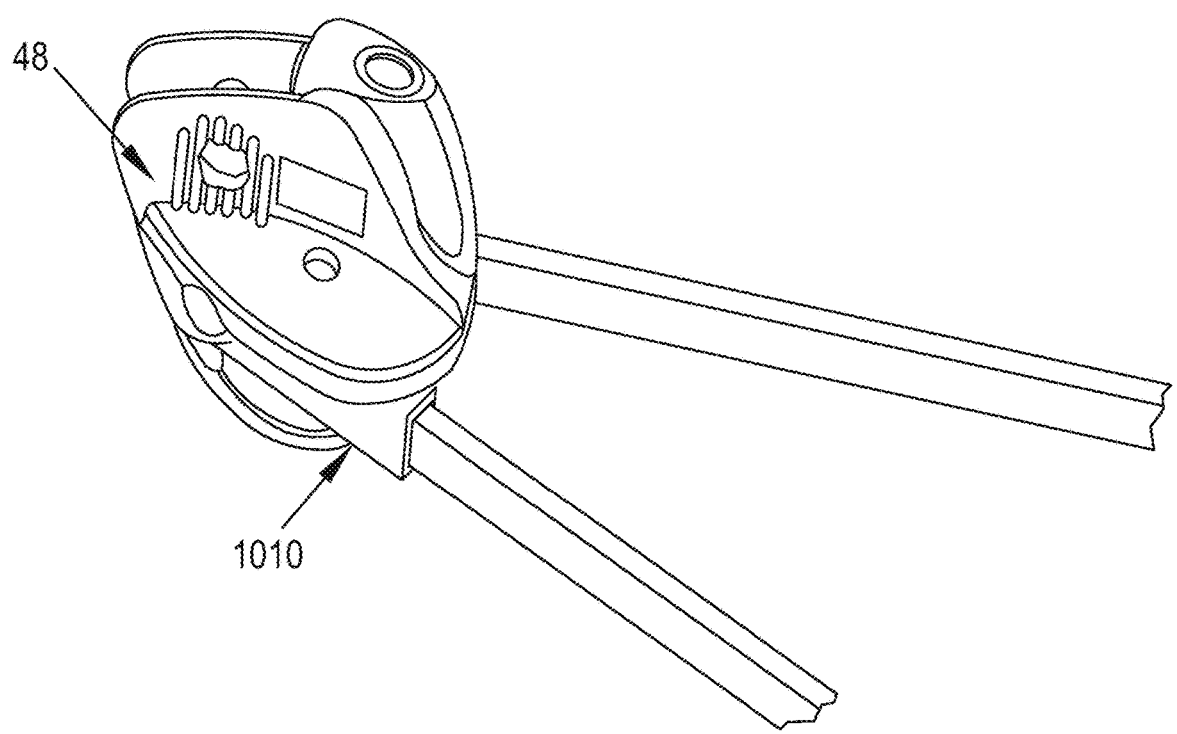
FIG. 15 is an illustration of an embodiment of a coupler for use in a weight distribution system to selectively couple a spring arm (or spring bar) to a towing vehicle.
Figure 16:
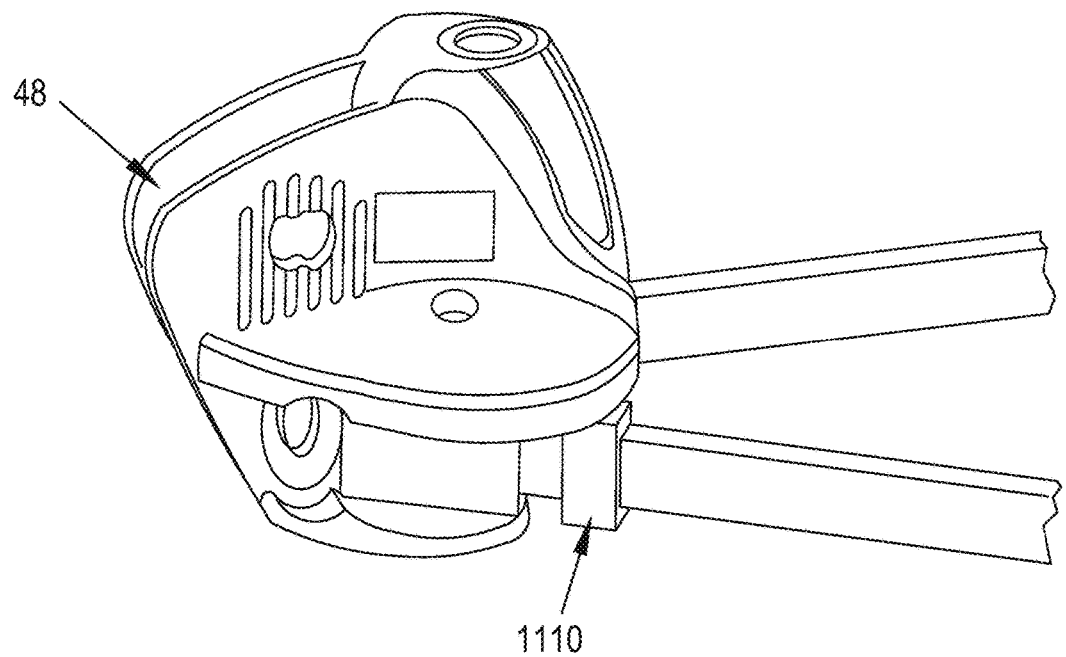
FIG. 16 is an illustration of an embodiment of a coupler for use in a weight distribution system to selectively couple a spring arm (or spring bar) to a towing vehicle.
Figure 17:
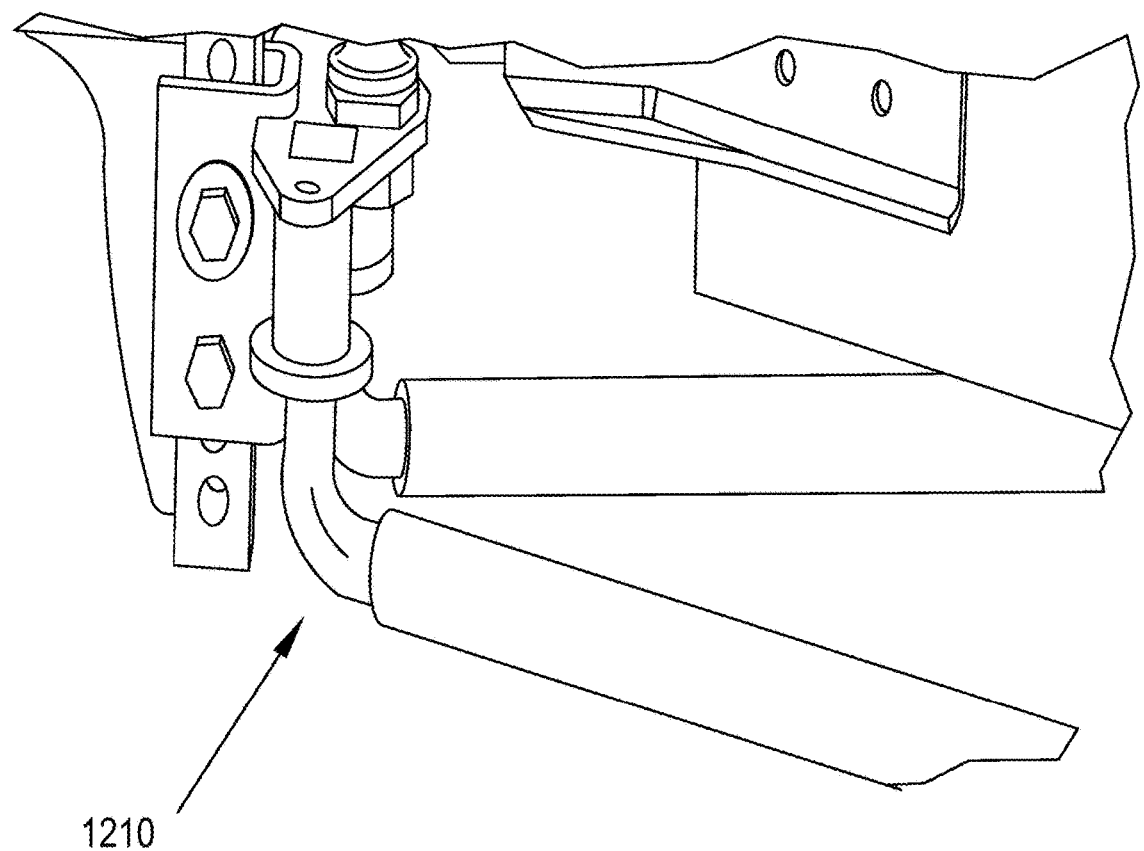
FIG. 17 is an illustration of an embodiment of a coupler for use in a weight distribution system to selectively couple a spring arm (or spring bar) to a towing vehicle.

Turning to FIGS. 15-17, shown are various embodiments of ball mount heads 48 an attachment portions thereto that selectively couple the spring bars to the towing vehicle 28, such as through the ball mount 48. Any of the spring bars previously disclosed, including spring bars 250, 350, 450, 550, 650, 750, 850, etc. may be used with any of the ball mount heads disclosed in FIGS. 15-17.

FIG. 15 shows a first embodiment of a ball mount head 1010 that selectively couples the spring bars to the towing vehicle 28, such as through the ball mount 48. The ball mount head 1010 may include a trunnion, tubing, etc., for the ball mount 48 contact that accepts the spring bar in a pocket of the ball mount head 1010. In an embodiment, the contacts between the spring bar and the ball mount head 1010 may result in vertical up and down forces for both torque and translation. The ball mount head 1010 may be hard or flexible. The ball mount head 1010 may be attached to or formed from the ball mount 48, and may be configured to receive the end of the spring bar. The ball mount head 1010 may comprise a composite material and the spring bar may be comprised of a different material than the ball mount head 1010.

FIG. 16 shows a second embodiment of a ball mount head 1110 that selectively couples the spring bars to the towing vehicle 28, such as through the ball mount 48. The ball mount head 1110 may include a sheath, sleeve, etc., for the spring bar that is inserted into the ball mount 48. In an embodiment, the ball mount head 1110 in FIG. 16 may be generally the same or similar to the ball mount head 1010 shown in FIG. 15, except that the FIG. 16 shows the one-piece ball mount head 1010 of FIG. 15 in a two-piece form as a two-piece ball mount head 1110. In an embodiment, the contacts between the spring bar and the ball mount head 1110 may result in vertical up and down forces for both torque and translation. The ball mount head 1110 may be hard or flexible. The ball mount head 1110 may be attached to or formed from the end of the spring bar, and may be configured to insert into the ball mount 48. The ball mount head 1110 may comprise a composite material and the spring bar may be comprised of a different material than the ball mount head 1110.

FIG. 17 shows a third embodiment of a ball mount head 1210 that selectively couples the spring bars to the towing vehicle 28, such as through the ball mount 48. The ball mount head 1210 may include a bent or straight rotating portion that the spring bars slip onto past the ball mount. The ball mount head 1210 may be configured to insert into a receiving portion at the end of the spring bars or the ball mount head 1210 may be hollow and configured to receive the end of the spring bar therein. The ball mount head 1210 may comprise a composite material and the spring bar may be comprised of a different material than the ball mount head 1210.

Figure 18:
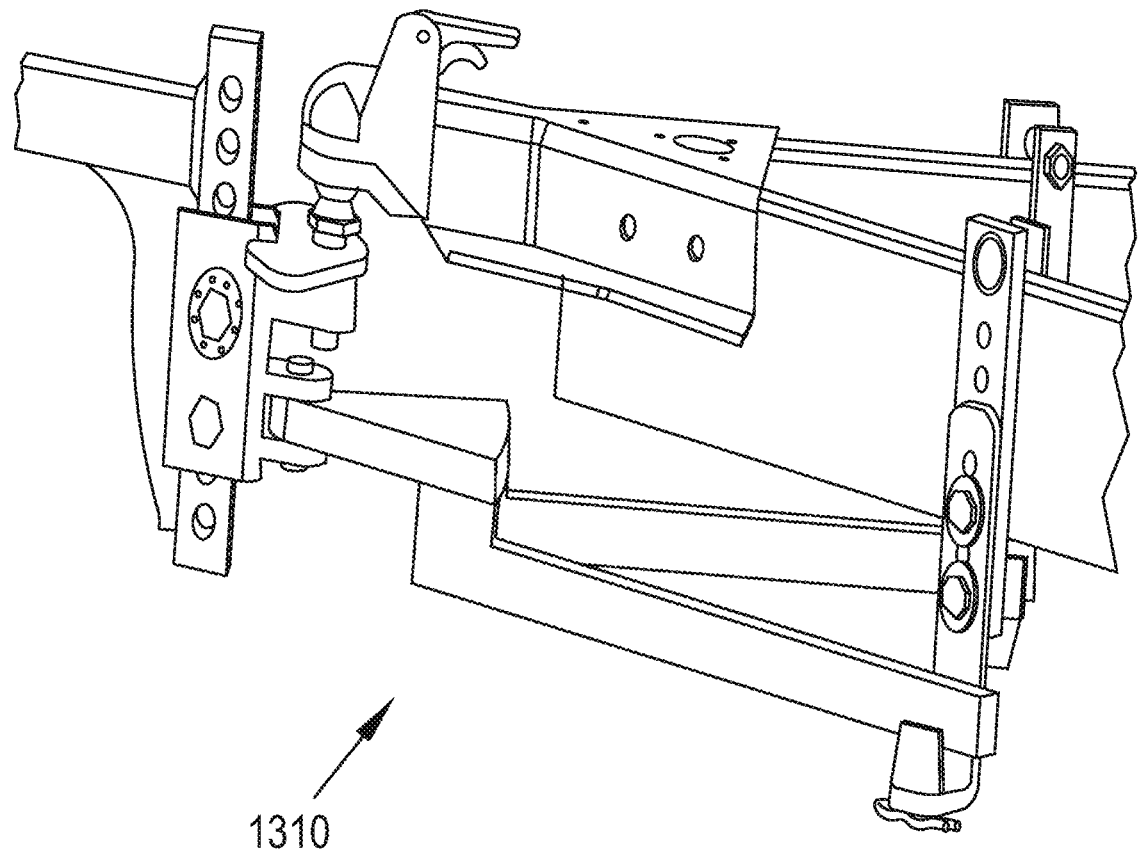
FIG. 18 is an illustration of an embodiment of a coupler for use in a weight distribution system to selectively couple a spring arm (or spring bar) to a towing vehicle.

FIG. 18 shows a fourth embodiment of a ball mount head 1310 that selectively couples the spring bars to the towing vehicle 28, such as through the ball mount 48. The ball mount head 1310 may include a composite leaf oriented to the trailer that twists through a hinged ball mount structure. The ball mount head 1310 may be hard or flexible. The ball mount head 1310 may comprise a composite material and the spring bar may be comprised of a different material than the ball mount head 1310.

Turning to FIGS. 19-21, shown are various embodiments of attachment assemblies or mounts that selectively attach the spring bars to the towed vehicle 24, such as to the A-frame member 36. Any of the spring bars previously disclosed, including spring bars 250, 350, 450, 550, 650, 750, 850, etc. may be used with any of the mounts disclosed in FIGS. 19-21.

FIGS. 19A-C show a first embodiment of a mount 1420 which includes selective coupling to a shoe 1430. The shoe 1430 may itself be coupled to or formed from the A-frame member 36, for example. The shoe 1430 may generally include a protrusion that extends from a bar or components of the A-frame member 36. The shoe 1430 may optionally include a bearing 1432 that surrounds all or a portion of the shoe 1430. The mount 1420 may provide an immediate linear force deflection curve. The mount 1420 may allow for more immediate increases in spring bar forces and sway resistance as the towing vehicle 28 and towed vehicle 24 articulate and travel.

The mount 1420 may extend from the spring bar and may include elongated portions 1422 and 1426 (cam lobes) that taper or ramp inward and form a reduced apex 1426 (cam "v") in between (e.g., in the middle of) elongated portions 1422 and 1426. The reduced apex 1426 may be configured to receive and hold the shoe 1430. The elongated portions 1422 and 1426 may hold the shoe 1430 on place at the reduced apex 1426 and prevent the shoe 1430 from dislodging from the mount 1420 and to secure the spring bars to the towed vehicle 24. Such mount 1420 may be selectively attached to the spring bars by pins and bolts, for example, or any other appropriate fastening means as desired, and may include pin receivers 1428 configured to receive the pin and bolts. The mount 1420 may be securable to any face of the spring bars and to dual rating spring bars that have different sized faces, such as that described for spring bars 850, 860. The mount 1420 may be fixed or have a rotating bearing. The metal wear faces can be bolted, pinned, overmolded, glued, riveted, etc. The different components, e.g., elongated portions 1422 and 1426 (cam lobes), reduced apex 1426 (cam "v"), and spring bars may incorporate or be formed from one or more different materials.

FIG. 20 shows a second embodiment of a mount 1520 which includes selective coupling to a shoe 1530. The shoe 1530 may itself be coupled to or formed from the A-frame member 36, for example. The shoe 1530 may generally include a protrusion that extends from a bar or components of the A-frame member 36. The shoe 1530 may optionally include a bearing 1532 that surrounds all or a portion of the shoe 1530. Shoe 1530 may be substantially similar or identical to the shoe 1430, but is noted that such mounts 1420, 1520 may accommodate various different shoes in shape and size than those shown for shoes 1430, 1530. The mount 1520 may provide an immediate linear force deflection curve. The mount 1520 may allow for more immediate increases in spring bar forces and sway resistance as the towing vehicle 28 and towed vehicle 24 articulate and travel.

The mount 1520 may extend from the spring bar and may include elongated portions 1422 and 1426 (cam lobes) that taper or ramp inward and form a reduced apex 1526 (cam "v") in between (e.g., in the middle of) elongated portions 1522 and 1526. The reduced apex 1526 may be configured to receive and hold the shoe 1530. The elongated portions 1522 and 1526 may hold the shoe 1530 on place at the reduced apex 1526 and prevent the shoe 1430 from dislodging from the mount 1520 and to secure the spring bars to the towed vehicle 24. Such mount 1420 may be selectively attached to the spring bars by a retaining pin or staking 1528, for example, or any other appropriate fastening means as desired, and may include pin receivers configured to receive the retaining pin or staking 1528. The mount 1520 may be configured to receive the entire end of the spring bars in a cavity and may be used to attach to dual rating spring bars that have different sized faces, such as that described for spring bars 850, 860. The mount 1520 may be fixed or have a rotating bearing. The metal wear faces can be bolted, pinned, overmolded, glued, riveted, etc. The different components, e.g., elongated portions 1522 and 1526 (cam lobes), reduced apex 1456 (cam "v"), and spring bars may incorporate or be formed from one or more different materials.

Figure 21A:
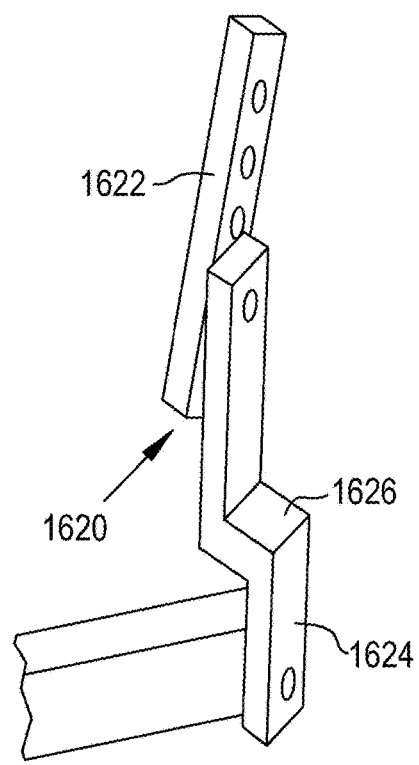
FIGS. 21A-C are illustrations of an embodiment of a mount for use in a weight distribution system to selectively attach a spring arm (or spring bar) to a towed vehicle.
Figure 21B:
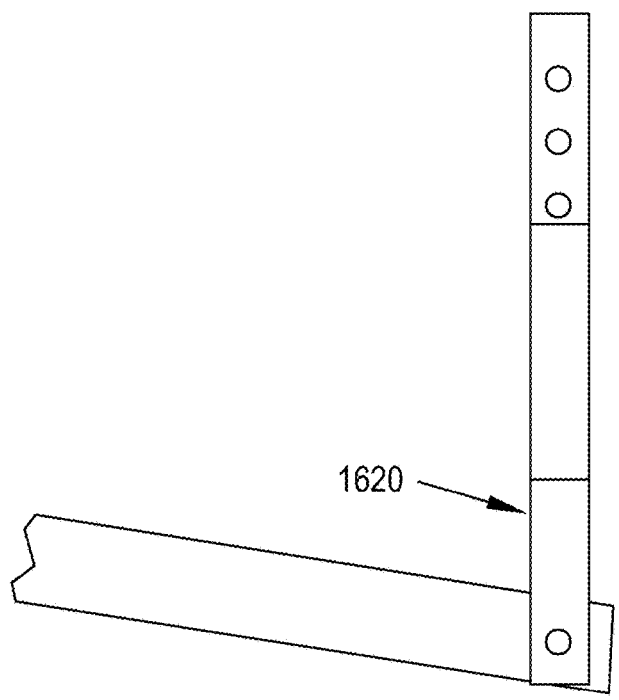
Figure 21C:
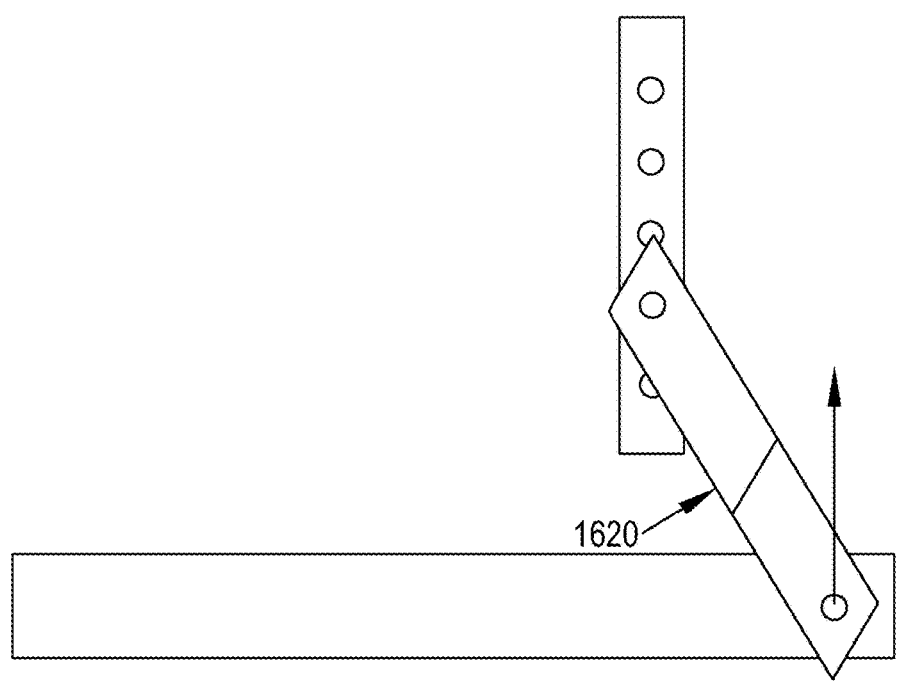

FIGS. 21A-C show a third embodiment of a mount 1620 which includes a radius linking design. In an embodiment, the mount 1620 may include a first link 1622 and a second link 1624. The first link 1622 may be straight. The first link 1622 may couple to the towed vehicle 24, e.g., by A-frame member 36. The first link 1622 may attach to the second link 1624. e.g., by a pin. The first link 1622 may include one or more pin receivers to attach to the second link 1624 at different lengths on the link 1622 based on the position of the used pin receiver. The second link 1624 may be asymmetrical and may include a step 1626 between two flat portions. The step 1626 may include an approximate right angle to provide a stepped depth of the second link 1624. The second link 1624 may couple to the spring bar. The mount 1620 may be rotatable about the point of attachment of one or more (or all of): the second link 1624 to the spring bar, the second link 1624 to the first link 1622, and the first link 1622 to the towed vehicle 24 or component thereof, compare FIGS. 21B and 21C, for example, showing an example of possible rotation. The mount 1620 may provide a progressive force-deflection curves (flat at initial displacement, then increasing). In an example, the force-deflection curve for mount 1620 may be proportionally shaped like the beginning (from X=0) portion of F(X)=absolute value [COS (X)−1] or F(X)=COS(X+PI), where X is the linkage rotation as a function of spring bar rotation as the towing vehicle 28 and towed vehicle 24 articulate and travel.

In an embodiment, the pinned interfaces may include a metal link 1622, 1624 and a metal pin or the materials of either may include a composite. In an embodiment, one or both ends of the radius links 1622, 1624 could be fixed and the link 1622, 1624 could serve as a secondary spring flexure. In an embodiment, the radius link 1622, 1624 may be a composite flexure. In an embodiment, the interfaces could be single shear or double shear. In an embodiment, the interfaces may have clutches or springs for additional resistance. In an embodiment, only the first link 1622 may be used, or the mount 1620 may include one or more straight links like link 1622 and may exclude the asymmetric second link 1624. In an embodiment, the links 1622, 1624 may be provided having different lengths or the lengths may be adjustable given a plurality of pin receivers that may be utilized to form the pinned interfaces.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

What is claimed is:

1. A weight distribution system comprising:
   at least one variable load spring bar, wherein the at least one variable load spring bar is configured to couple to a towing vehicle and a towed vehicle, the at least one variable load spring bar comprising:
   a first end comprising a first flat portion and a first tapered portion, a second end comprising a second flat portion and a second tapered portion which is shorter than the first tapered portion, and a middle section connected to the first and second flat portions by the first and second tapered portions, wherein the middle section is thinner than the first flat portion and the second flat portion, and the first and second ends are asymmetrical,
   wherein the at least one variable load spring bar is configurable into two different positions relative to the towing vehicle and towed vehicle, wherein a first position is more rigid and carries more of a load and the second position is more flexible and carries less of the load.

2. The weight distribution system of claim 1, wherein the first end of the at least one variable load spring bar is attachable to a hitch mount in a first position and the second end of the at least one variable load spring bar is attachable to the hitch mount in a second position.

3. The weight distribution system of claim 1 further comprising a first pair of opposite faces having a constant size and a second pair of opposite faces having a variable size.

4. The weight distribution system of claim 3, wherein the variable sized faces taper in size from a first width at the first end to a second width at the second end, wherein the first width and the second width are different.

5. The weight distribution system of claim 4, wherein the first width at the first end is longer than the second width at the second end.

6. The weight distribution system of claim 5, wherein the constant sized faces have the same width at the first end of the at least one variable load spring bar and at the second end of the at least one variable load spring bar.

7. The weight distribution system of claim 6, wherein the first end of the at least one variable load spring bar is attachable to a hitch mount so that the variable sized faces face upwards and downwards in a first position and wherein the first end of the at least one variable load spring bar is attachable to a hitch mount so that the constant sized faces face upwards and downwards in a second position.

8. The weight distribution system of claim 7, wherein the at least one variable load spring bar is transitionable between the first and the second positions by an approximate 90 degree turn.

9. The weight distribution system of claim 1, further comprising a stiffening member coupled to the at least one variable load spring bar.

10. A weight distribution system for coupling a towed vehicle to a towing vehicle comprising:
two variable load spring bars, each variable load spring bar including:
a first end including a first flat portion and a first tapered portion;
a second end including a second flat portion and a second tapered portion, and
a middle section connected to the first and second flat portions by the first and second tapered portions, wherein the middle section is thinner than the first flat portion and the second flat portion, and the first and second ends are asymmetrical;
wherein each variable load spring bar is configurable in:
a first position relative to the towing vehicle and the towed vehicle that carries a load; and a second position that is more flexible and carries less of the load than the first position.

11. The weight distribution system of claim 10, wherein the first end of the variable load spring bars are attachable to a hitch mount in the first position and the second end of the variable load spring bars are attachable to the hitch mount in the second position.

12. The weight distribution system of claim 10, wherein the variable load spring bars are transitionable between the first and the second positions by an approximate 90 degree turn.

13. The weight distribution system of claim 10, further comprising a stiffening member coupled to the variable load spring bars.

* * * * *